United States Patent
Chun et al.

(10) Patent No.: US 10,038,535 B2
(45) Date of Patent: Jul. 31, 2018

(54) METHOD AND APPARATUS FOR TRANSMITTING FRAME ON BASIS OF SOUNDING PROCEDURE

(71) Applicant: LG ELECTRONICS INC., Seoul (KR)

(72) Inventors: Jinyoung Chun, Seoul (KR); Kiseon Ryu, Seoul (KR); Wookbong Lee, Seoul (KR); Jinsoo Choi, Seoul (KR); Dongguk Lim, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 14 days.

(21) Appl. No.: 15/302,922

(22) PCT Filed: Feb. 16, 2015

(86) PCT No.: PCT/KR2015/001551
§ 371 (c)(1),
(2) Date: Oct. 7, 2016

(87) PCT Pub. No.: WO2015/156495
PCT Pub. Date: Oct. 15, 2015

(65) Prior Publication Data
US 2017/0033898 A1    Feb. 2, 2017

Related U.S. Application Data

(60) Provisional application No. 61/977,100, filed on Apr. 9, 2014, provisional application No. 62/014,701, filed on Jun. 20, 2014.

(51) Int. Cl.
*H04L 5/00* (2006.01)
*H04W 84/12* (2009.01)
(Continued)

(52) U.S. Cl.
CPC .......... *H04L 5/005* (2013.01); *H04B 7/0417* (2013.01); *H04B 7/0452* (2013.01); *H04W 84/12* (2013.01)

(58) Field of Classification Search
None
See application file for complete search history.

(56) References Cited

U.S. PATENT DOCUMENTS 5,258,980 A * 11/1993 Maebara ............... H04W 36/18
                                                    370/347
7,336,642 B2 * 2/2008 Rich ..................... H04W 74/06
                                                    370/348
(Continued)

FOREIGN PATENT DOCUMENTS

WO   2011065743 A2   6/2011
WO   2013022254 A2   2/2013
(Continued)

*Primary Examiner* — Bunjob Jaroenchonwanit
(74) *Attorney, Agent, or Firm* — Lee Hong Degerman Kang & Waimey

(57) ABSTRACT

A method and apparatus for transmitting a frame on the basis of a sounding procedure is disclosed. The method for transmitting the frame on the basis of a sounding procedure in a wireless LAN may comprise the steps of: transmitting an NDPA frame to each of multiple STAs by an AP wherein the NDPA frame notifies of the transmission of NDP; transmitting the NDP to each of the multiple STAs by the AP; receiving, by the AP, multiple feedback frames transmitted through multiple transmission sources allocated to the multiple STAs in time sources overlapped by the multiple STAs, respectively; and transmitting, by the AP, multiple downlink frames to the multiple STAs respectively.

8 Claims, 15 Drawing Sheets

(51) Int. Cl.
*H04B 7/0452* (2017.01)
*H04B 7/0417* (2017.01)

(56) References Cited

U.S. PATENT DOCUMENTS

| | | | | | |
|---|---|---|---|---|---|
| 8,537,876 | B2* | 9/2013 | Hooli | ................... | H04B 1/7143 370/320 |
| 2004/0036590 | A1* | 2/2004 | Elsner | ................ | B60C 23/0433 340/445 |
| 2006/0159174 | A1* | 7/2006 | Chono | ................... | H04N 19/13 375/240.16 |
| 2007/0002800 | A1* | 1/2007 | Sondur | .............. | H04L 27/2657 370/332 |
| 2009/0059838 | A1* | 3/2009 | Min | ...................... | H04B 7/155 370/315 |
| 2011/0299571 | A1* | 12/2011 | Del-Toso | ............ | H04L 25/0212 375/148 |
| 2012/0063439 | A1* | 3/2012 | Seok | .................... | H04L 1/0025 370/338 |
| 2012/0300874 | A1* | 11/2012 | Zhang | ................... | H04L 5/0048 375/295 |
| 2013/0055271 | A1* | 2/2013 | Yoo | ......................... | G06F 13/22 718/102 |
| 2013/0107916 | A1 | 5/2013 | Liu et al. | | |
| 2014/0328167 | A1* | 11/2014 | Stephens | ............... | H04W 74/06 370/229 |
| 2015/0009940 | A1* | 1/2015 | Liu | ....................... | H04L 5/0023 370/329 |
| 2015/0063128 | A1* | 3/2015 | Garikipati | ........... | H04B 7/0417 370/252 |
| 2015/0201401 | A1* | 7/2015 | Lahetkangas | ........ | H04L 1/0079 370/329 |
| 2016/0029357 | A1* | 1/2016 | Lv | ......................... | H04W 72/04 370/235 |
| 2016/0234858 | A1* | 8/2016 | Bao | ....................... | H04W 72/12 |
| 2017/0063512 | A1* | 3/2017 | Wu | ....................... | H04L 5/0023 |

FOREIGN PATENT DOCUMENTS

WO     2013055117 A2     4/2013
WO     2013077600 A1     5/2013

* cited by examiner

FIG. 1
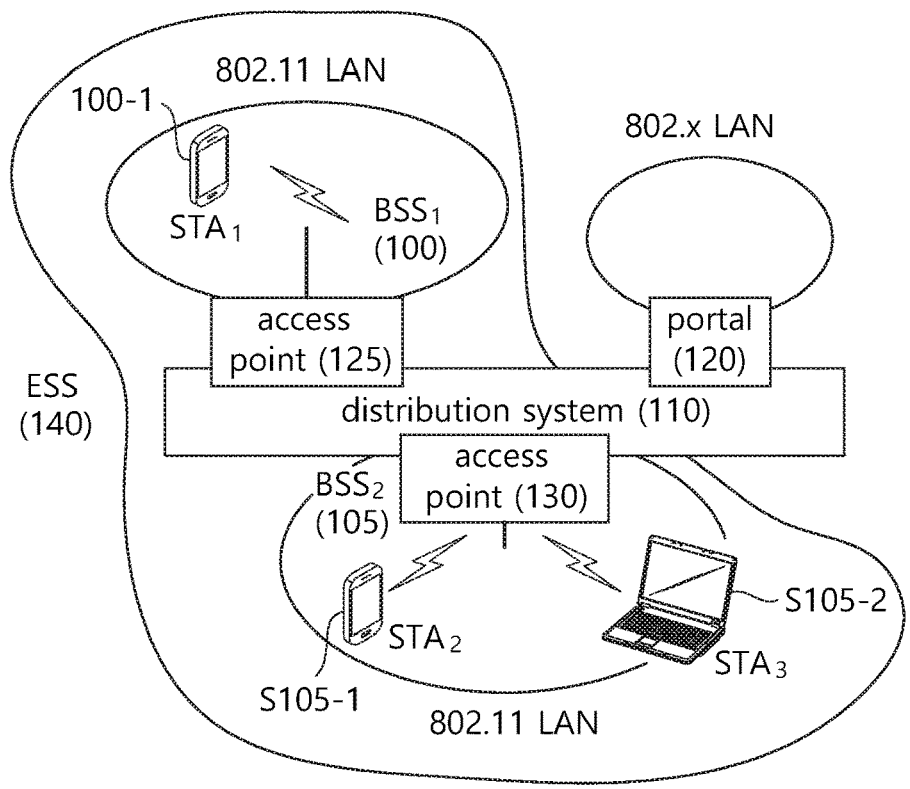
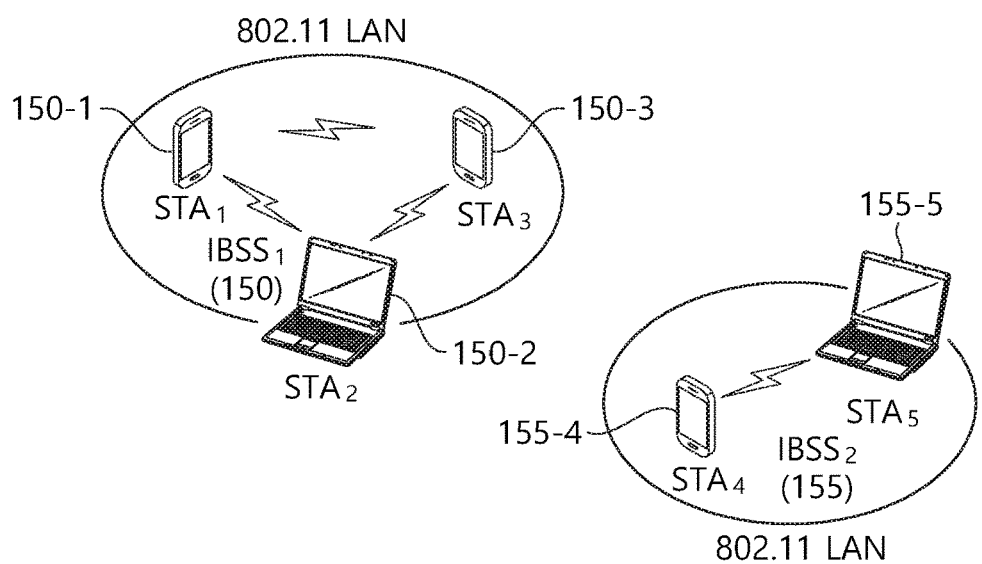

METHOD AND APPARATUS FOR TRANSMITTING FRAME ON BASIS OF SOUNDING PROCEDURE

CROSS-REFERENCE TO RELATED APPLICATIONS

This application is the National Stage filing under 35 U.S.C. 371 of International Application No. PCT/KR2015/001551, filed on Feb. 16, 2015, which claims the benefit of U.S. Provisional Application No. 61/977,100, filed on Apr. 9, 2014 and 62/014,701, filed on Jun. 20, 2014, the contents of which are all hereby incorporated by reference herein in their entirety.

BACKGROUND OF THE INVENTION

Field of the Invention

The present invention relates to wireless communications, and more particularly, to a method and apparatus for transmitting a frame on the basis of a sounding procedure.

Related Art

A wireless local area network (WLAN) system may support a downlink multi user-multiple input multiple output (MU-MIMO) transmission method for a higher throughput. An access point (AP) may simultaneously transmit data frames to at least one or more stations (STAs) which are MIMO-paired through a downlink. In the legacy WLAN system, the maximum number of paired STAs may be 4, and when the maximum number of spatial streams is 8, up to 4 spatial streams may be allocated to each STA.

For example, in the WLAN system, the AP may simultaneously transmit data to an STA group including at least one or more STAs among a plurality of STAs associated with the AP. In a WLAN system in which the AP not only performs MU-MIMO transmission to the STAs but also supports a tunneled direct link setup (TDLS) or direct link setup (DLS) and a mesh network, an STA which intends to transmit data may transmit a PLCP protocol data unit (PPDU) to the plurality of STAs by using the MU-MIMO transmission scheme. In case of using MU-MIMO, data to be transmitted to each STA may be transmitted through a different spatial stream.

SUMMARY OF THE INVENTION

An object of the present invention is to provide a method of receiving a frame on the basis of a sounding procedure.

Another object of the present invention is to provide an apparatus for performing a method of receiving a frame on the basis of a sounding procedure.

In order to achieve the above object of the present invention, according to one aspect of the present invention, a method of transmitting a frame on the basis of a sounding procedure in a wireless local area network (WLAN) may include: transmitting by an access point (AP) a null data packet announcement (NDPA) frame to each of a plurality of stations (STAs), wherein the NDPA frame reports transmission of a null data packet (NDP); transmitting by the AP the NDP to each of the plurality of STAs; receiving by the AP a plurality of feedback frames to be transmitted respectively through a plurality of transmission resources allocated respectively to the plurality of STAs on an overlapping time resource respectively by the plurality of STAs; and transmitting by the AP a plurality of downlink frames respectively to the plurality of STAs. The plurality of feedback frames may respectively include a plurality of pieces of channel state information determined on the basis of the NDP. The plurality of downlink frames may be respectively transmitted based on the plurality of pieces of channel state information within a specific time after respectively receiving the plurality of feedback frames.

In order to achieve the above object of the present invention, according to another aspect of the present invention, an AP for transmitting a frame on the basis of a sounding procedure in a WLAN may include: a radio frequency (RF) unit implemented to transmit or receive a radio signal; and a processor operatively coupled to the RF unit. The processor may be configured for: transmitting an NDPA frame to each of a plurality of STAs, wherein the NDPA frame reports transmission of an NDP; transmitting the NDP to each of the plurality of STAs; receiving a plurality of feedback frames to be transmitted respectively through a plurality of transmission resources allocated respectively to the plurality of STAs on an overlapping time resource respectively by the plurality of STAs; and transmitting a plurality of downlink frames respectively to the plurality of STAs. The plurality of feedback frames may respectively include a plurality of pieces of channel state information determined on the basis of the NDP. The plurality of downlink frames may be respectively transmitted based on the plurality of pieces of channel state information within a specific time after respectively receiving the plurality of feedback frames.

Since a frame is transmitted based on channel state information acquired on the basis of a sounding procedure, data transmission efficiency can be increased.

BRIEF DESCRIPTION OF THE DRAWINGS

FIG. 1 is a concept view illustrating the structure of a wireless local area network (WLAN).

DESCRIPTION OF EXEMPLARY EMBODIMENTS

FIG. 1 is a concept view illustrating the structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
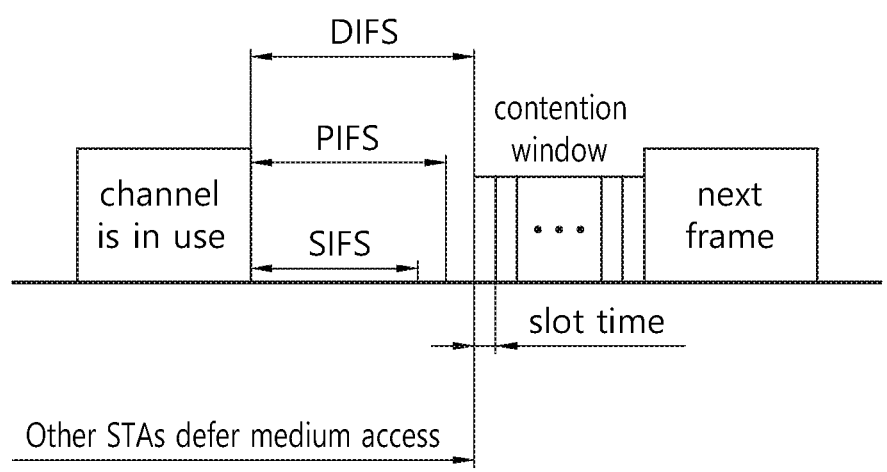
FIG. 2 is a conceptual view showing an interval (or gap) between frames.

FIG. 2 is a conceptual view showing an interval (or gap) between frames.

Referring to FIG. 2, a time difference between two frames being transmitted within a medium may be referred to as an IFS (interframe space). The priority of an STA occupying a wireless medium (or radio medium) may be decided based on IFSs having different lengths. Frames being transmitted within a medium may be transmitted based on IFSs having different lengths. For example, IFSs having different lengths may be used for transmitting frames within the medium.

(1) SIFS (short inter frame symbol): This is used for the transmission of RTS (request to send) frames/CTS (clear to send) frames, ACK (acknowledgement) frames.

(2) PIFS (PCF (point coordination function) IFS): This is used for the transmission of PCF frames (e.g., channel switch announcement frames, TIM (Traffic indication map) frames, and so on) and for the frame transmission of STAs performing channel access based on PCF (point coordination function).

(3) DIFS (DCF IFS): This is used for frame transmission of STAs performing DCF based channel access.

(4) EIFS (extended IFS): This is used only when a frame transmission error occurs, and this is not a fixed gap (or interval).

The calculation equation for each IFS is as shown below in Equation 1 to Equation 3, and the numerical values given in the parentheses next to each parameter may correspond to general numerical values respective to each parameter. The value of each parameter may vary in accordance with the capacity of the STA or in accordance with the communication environment. Each equation is disclosed in 9.3.7 DCF timing relation of the IEEE P802.11-REVmc™/D2.0 document, which is disclosed in October 2013, and the parameters used in each equation are disclosed in 6.5.4 PLME-CHARACTERISTICS.confirm of the IEEE P802.11-REVmc™/D2.0 document and 6.5 PLME SAP interface of the IEEE Std 802.11ac™-2013 document, and so on.

$$SIFS(16\ \mu s) = aRxRFDelay(0.5) + aRxPLCPDelay(12.5) + aMACProcessingDelay(1\ or\ <2) + aRxTxTurnaroundTime(<2)$$

$$aRxTxTurnaroundTime = aTxPLCPDelay(1) + aRxTxSwitchTime(0.25) + aTxRampOn\ Time(0.25) + aTxRFDelay(0.5) \quad <\text{Equation 1}>$$

Referring to FIG. 1, the SIFS may correspond to a value that is based on a RF (radio frequency) delay, a PLCP (physical layer convergence protocol) delay, MAC (medium access control) processing delay, and shifting time from Rx to Tx. For example, the SIFS may correspond to a time period starting from a time when the last symbol of a receiving frame of the STA is received from a medium (or air interface) up to a time when a first symbol of a transmitting frame of the STA is transmitted to the medium (or air interface).

$$PIFS(25\ \mu s) = aSIFSTime + aSlotTime$$

$$aSlotTime = aCCATime(<4) + aRxTxTurnaroundTime(<2) + aAirPropagationTime(<1) + aMACProcessingDelay(<2) \quad <\text{Equation 2}>$$

Herein, aAirProgationTime may correspond to two times the propagation time (or propagation delay) for signal transmission at a maximum distance between STAs that are synchronized to the furthermost slots within a communicatable range. Herein, the aAirProgationTime may correspond to a value that is equal to or less than 1 μs. The radio wave may be propagated at 300 m/μs.

$$DIFS(\text{distributed (coordination function) interframe space})(34\ \mu s) = aSIFSTime + 2 \times aSlotTime \quad <\text{Equation 3}>$$

Referring to Equation 1 to Equation 3, the SIFS, PIFS, and DIFS values may vary in accordance with the capability of the STAs and/or in accordance with the wireless communication environment. For example, in accordance with the capability of the STAs and/or in accordance with the wireless communication environment, the SIFS may be given a maximum value of 16 μs, and the PIFS may be given a value ranging from a minimum value of 16 μs to a maximum value of 25 μs.

An access point (AP) operating in a wireless local area network (WLAN) system may transmit data through the same time resource to each of a plurality of stations (STAs). Such transmission of the AP may be expressed by the term 'downlink multi-user (DL MU) transmission' when transmission from the AP to the STA is defined as downlink transmission.

In the legacy WLAN system, the AP may perform DL MU transmission on the basis of MU MIMO, and such transmission may be expressed by the term 'DL MU MIMO transmission'. In the embodiment of the present invention, the AP may perform DL MU transmission on the basis of OFDMA, and such transmission may be expressed by the term 'DL MU OFDMA transmission'. In case of using the DL MU OFDMA transmission, the AP may transmit a downlink frame to each of a plurality of STAs respectively through a plurality of frequency resources on an overlapping time resource.

A PPDU, frame, and data transmitted through downlink transmission may be respectively expressed by the term 'downlink PPDU', 'downlink frame', and 'downlink data'. The PPDU may be a data unit including a PPDU header and a physical layer service data unit (PDSU) (or a MAC protocol data unit (MPDU)). The PPDU header may include a PHY header and a PHY preamble, and the PDSU (or MPDU) may include a frame or may indicate the frame.

On the contrary, transmission from the STA to the AP may be regarded as uplink transmission, and data transmission from the plurality of STAs to the AP on the same time resource may be expressed by the term 'uplink multi-user (UL MU) transmission'. Unlike in the legacy WLAN system, the UL MU transmission may be supported in a WLAN system according to the embodiment of the present invention. A PPDU, frame, and data transmitted through uplink transmission may be respectively expressed by the term 'uplink PPDU', 'uplink frame', and 'uplink data'. Uplink transmission performed by each of the plurality of STAs may be performed on a frequency domain or a spatial domain.

If the uplink transmission performed by each of the plurality of STAs is performed on the frequency domain, different frequencies may be allocated respectively for the plurality of STAs as an uplink transmission resource on the basis of orthogonal frequency division multiplexing (OFDMA). The plurality of STAs may transmit an uplink frame to the AP respectively through different frequency resources. Such a transmission method using the different frequency resource may be expressed by the term 'UL MU OFDMA transmission method'.

If the uplink transmission performed by each of the plurality of STAs is performed on the spatial domain, different spatial streams may be respectively allocated for the plurality of STAs, and thus the STAs may transmit an uplink frame to the AP respectively through different spatial streams. Such a transmission method using the different spatial resource may be expressed by the term 'UL MU MIMO transmission method'.

Figure 3:
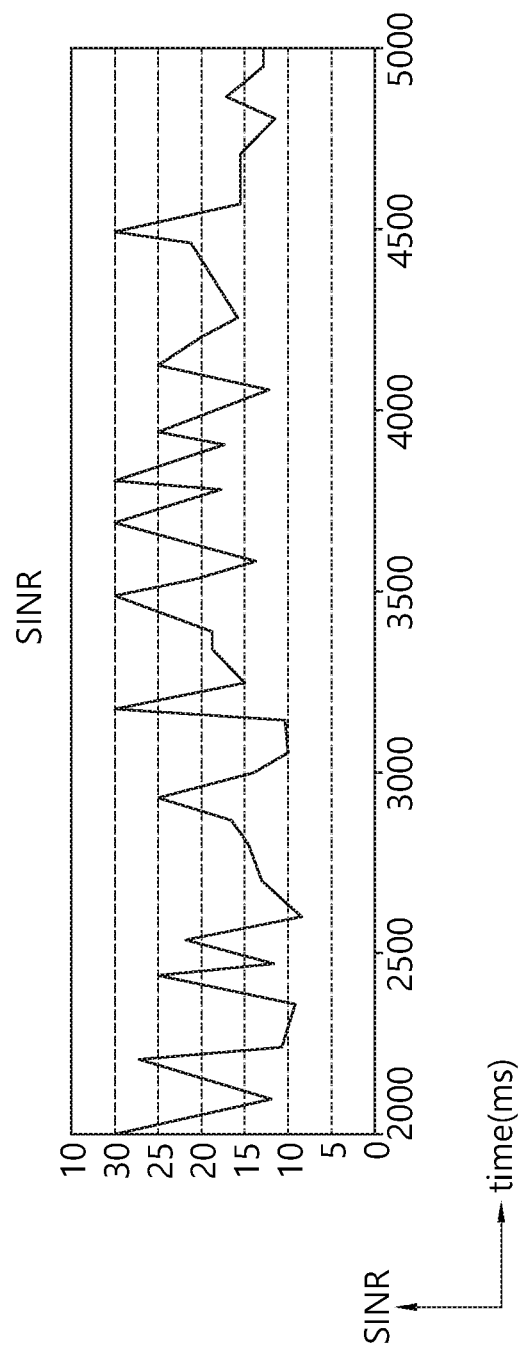
FIG. 3 shows a measurement of a signal to interference plus noise ratio (SINR) of an uplink frame.

FIG. 3 shows a measurement of an SINR of an uplink frame.

Disclosed in FIG. 3 is a signal to interference plus noise ratio (SINR) measured in an access point (AP) when an STA transmits an uplink frame on the basis of a space time block code (STBC).

Referring to FIG. 3, an X-axis represents an experimental time from 2000 ms to 5000 ms, and a Y-axis represents an SINR based on a time. Referring to the graph, it can be seen that an SINR value is changed significantly whenever each frame is transmitted. In this case, it may be difficult to determine a parameter (a modulation and coding scheme (MCS)) based on a channel state for current frame transmission on the basis of SINR information of a previous feedback frame.

In addition, a result of performing an experiment by setting feedback information (SINR) as a factor in an outdoor large BSS scenario is as follows.

A first case may be a case where there is no feedback for an SINR. In this case, an STA may perform cyclic redundancy check (CRC) starting from a modulation and coding scheme (MCS) level (or index) 0, and may increase an MCS level (or index) by 1 if transmission is successful 10 times, and may decrease the MCS level by 1 if transmission fails two times.

A second case may be a case where there is a feedback for an SINR but feedback information is determined on TXOP of a previous frame (or a frame transmitted in a range outside a threshold time with respect to a current frame) (feedback (previous)). In this case, an STA may determine channel variation information (e.g., MCS) determined depending on feedback information (or channel state information) by subtracting or adding an SINR margin (or 0.5 dB, 2 dB) from or to a current SINR according to CRC check information of a previous frame and/or whether to receive an ACK frame.

A third case may be a case where there is a feedback for an SINR but feedback information is determined on TXOP of a current frame (or a frame transmitted in a range within a specific threshold time with respect to the current frame) (feedback (current)). For example, the STA may generate feedback information on the basis of an NDPA frame and NDP received from an AP within a threshold time (e.g., SIFS time) with respect to the current frame. For another example, the feedback information may be generated through a frame acquired on TXOP configured based on a procedure of transmitting and receiving an RTS frame and a CTS frame. The STA may transmit the generated feedback information (e.g., SINR information) to the AP. The AP may determine channel variation information on the basis of the feedback information, and may generate a downlink frame on the basis of the determined channel variation information and transmit it to the STA. The AP may determine the channel variation information (e.g., MCS) by subtracting or adding an SINR margin (e.g., 0.5 dB, 2 dB) from or to the current SINR according to the received feedback information and/or whether the feedback frame is received. The determined MCS may be used by the AP to transmit a next downlink frame.

Table 1 below shows a downlink throughput and an uplink throughput when the feedback information is not received, for a case where the feedback information is acquired on TXOP of a previous frame and for a case where the feedback information is acquired on TXOP of a current frame.

TABLE 1

| Experimental option | DL Tput (Mbps) | MCS 0/1/.../8 distribution (%) | UL Tput (Mbps) | UL MCS 0/1/.../8 distribution (%) |
|---|---|---|---|---|
| No feedback | 8.46 | 5/5/4/6/7/6/8/11/48 | 11.0 | 32/13/14/13/13/7/3/2/2 |
| Feedback (previous) | 8.16 | 6/3/1/8/3/5/3/11/59 | 10.0 | 42/5/11/14/9/6/7/6/0 |
| Feedback (current) | 10.0 | 9/2/3/5/4/3/3/11/61 | 18.5 | 42/5/6/9/8/4/3/12/12 |

Referring to Table 1, it can be seen that the case where the same feedback information is determined on the TXOP of the current frame (or the frame transmitted in the range within the specific threshold time with respect to the current frame) (i.e., feedback (previous)) is not different from the no-feedback case, or disadvantageously, has performance deterioration due to an overhead.

The case where the feedback information is determined on the TXOP of the current frame (or the frame transmitted in the range within the specific threshold time with respect to the current frame) has relatively higher performance in terms of a downlink throughput and an uplink throughput in comparison with the no-feedback case and the feedback (previous) case.

A procedure of acquiring feedback information on the basis of a sounding procedure using an NDPA frame is defined in the legacy WLAN system. However, a transmission timing of a frame based on the acquired feedback information is not defined. In the legacy WLAN system, an STA performs channel access in a contention based manner to transmit the frame on the basis of the feedback information. In this case, an interval between a timing of acquiring the feedback information of the STA and a timing of transmitting the frame based on the feedback information of the STA may be increased. The increase in the interval between the timings may cause performance deterioration as shown in the aforementioned Table 1.

In addition, in order to transmit feedback information and to transmit a downlink frame based on the feedback information on the basis of DL MU transmission and UL MU transmission according to the embodiment of the present invention, a grouping procedure may be necessary for a plurality of STAs for receiving a downlink frame based on DL MU transmission and for transmitting an uplink frame based on UL MU transmission.

If the grouping procedure for the plurality of STAs, the procedure of acquiring the feedback information from the plurality of STAs after the grouping of the plurality of STAs, and the procedure for transmitting a frame based on the feedback information after acquiring the feedback information from the plurality of STAs are performed at different timings, there may be not much significant advantage based on the feedback information.

Accordingly, in the embodiment of the present invention, the STA may determine channel variation information (MCS, the number of streams, a beamforming vector, etc.) on the basis of the feedback information included in the feedback frame transmitted in an adjacent time, and may transmit the frame. Hereinafter, for convenience of explanation, the embodiment of the present invention discloses a method in which the AP acquires the feedback information from the STA, and transmits a downlink frame (e.g., a downlink data frame, a downlink management frame) on the basis of the acquired feedback information.

However, hereinafter, the AP may be interpreted as the STA according to a situation (e.g., a WLAN system supporting a tunneled direct link setup (TDLS) or direct link setup (DLS) and a mesh network) in the embodiment of the present invention. In addition, on the contrary, even if the STA acquires feedback information and transmits an uplink frame based on the acquired feedback information, a procedure of transmitting/receiving a data unit (e.g., PPDU or a frame) on the basis of a sounding procedure according to the embodiment of the present invention may also be applied.

Figure 4:
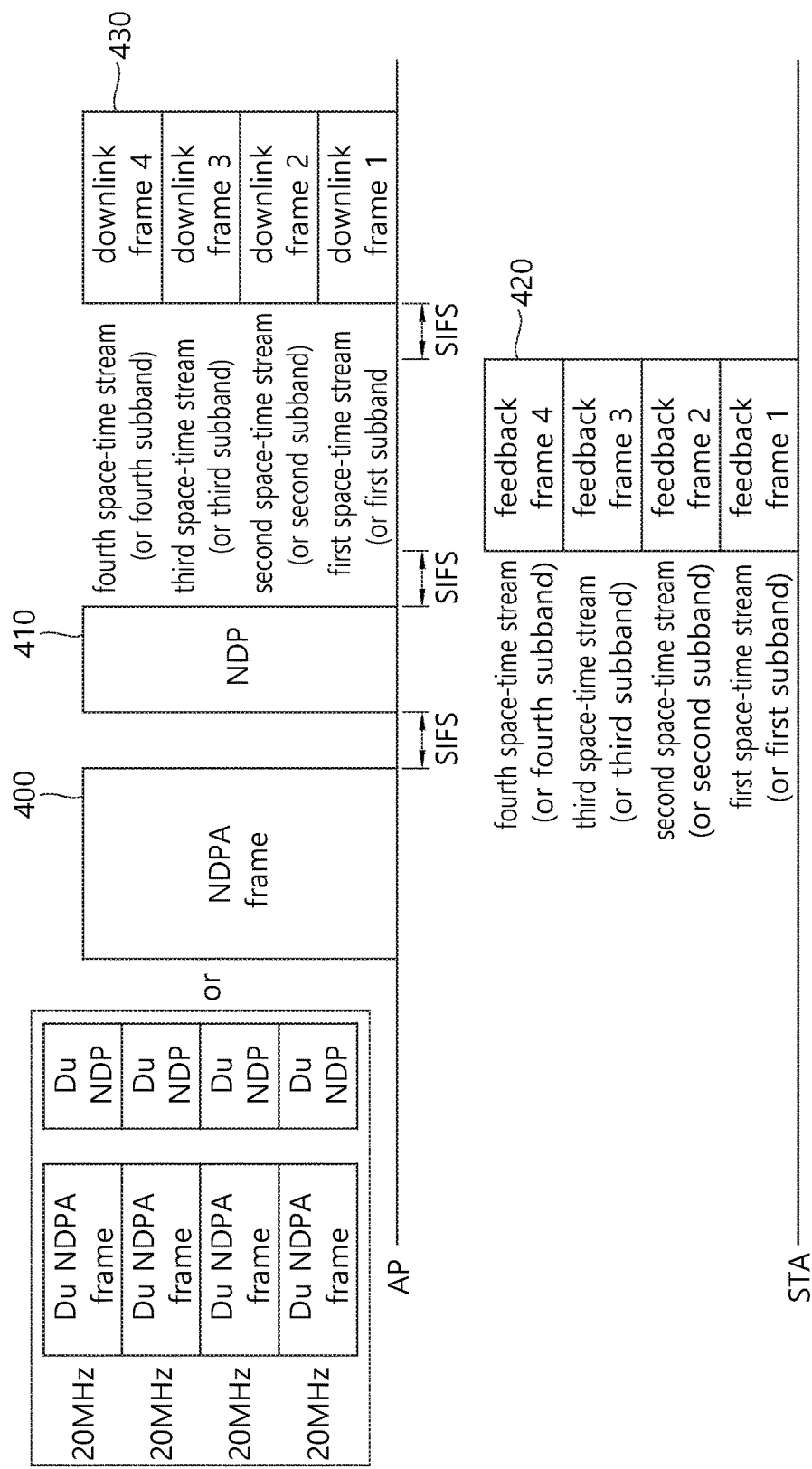
FIG. 4 is a concept view illustrating a method of transmitting a frame on the basis of a sounding procedure according to an embodiment of the present invention.

FIG. 4 is a concept view illustrating a method of transmitting a frame on the basis of a sounding procedure according to an embodiment of the present invention.

Disclosed in FIG. 4 is a method of transmitting a frame on the basis of a sounding procedure for a single STA. The sounding procedure may be a procedure for acquiring channel state information. More specifically, disclosed is a method in which an AP performs the sounding procedure with respect to the STA, and transmits a downlink frame to the STA through SU-MIMO (or OFDMA) according to feedback information acquired on the basis of the sounding procedure.

The AP may transmit a null data packet announcement (NDPA) frame 400 to the STA for the sounding procedure, and may transmit an NDP 410 after a specific time (e.g., a short interframe space (SIFS)).

The NDPA frame 400 may be used to report to the STA that the sounding procedure starts and the NDP 410 is transmitted. The NDPA frame 400 may include an STA information field. The STA information field may indicate an STA for receiving the NDP 410 to be transmitted after the NDPA frame 400 and for transmitting a feedback frame. The STA indicated on the basis of the STA information field may estimate a channel on the basis of the NDP 410 and may transmit a feedback frame 420 including the channel state information to the AP. That is, the STA may determine whether to transmit the feedback frame 420 to the AP by participating in channel sounding on the basis of the STA information field included in the received NDPA frame 400.

The NDP 410 may have a format which includes only a PPDU header by omitting a data field from the typical PPDU. The NDP 410 may be preceded by the AP on the basis of a specific precoding matrix. Upon receiving the NDP 410, the STA may estimate a channel on the basis of a training field (e.g., HE-LTF) of the NDP 410 and may acquire channel state information. Since the NDP 410 does not have the data field, length information indicating a PSDU length included in the data field of the NDP 410 or a length of an aggregate-MAC protocol data unit (A-MPDU) included in the PSDU may be set to 0.

Each of the NDPA frame 400 and the NDP 410 may be transmitted through a full bandwidth for transmission of the NDPA frame 400 and the NDP 410. The PPDU format may be expressed by the term 'non-duplicated PPDU format'.

Alternatively, each of the NDPA frame 400 and the NDP 410 may be transmitted through a plurality of channels on the basis of a duplicate PPDU format. The duplicate PPDU format may be transmitted through a bandwidth greater than 20 MHz (e.g., 40 MHz, 80 MHz, 160 MHz, 80 MHz+80 MHz, etc.) by replicating the PPDU format transmitted through an adjacent channel (or a primary channel) (20 MHz). When a duplicate format 450 is used, the same data may be transmitted through each of a plurality of channels (a replication target channel and a replication channel). That is, an NDPA PPDU (or NDP) may be used based on a duplicate format used to carry replicated information through each of a plurality of channels. The NDPA frame 400 and the NDP 410 having the non-duplicate PPDU format or the duplicate PPDU format may be transmitted to at least one STA through at least one space-time stream. If the AP receives a feedback frame from a single STA as shown in FIG. 4, the AP may transmit the NDPA frame 400 and the NDP 410 to the single STA through at least one stream. If the AP receives the feedback frame from the single STA, the NDPA frame 400 may indicate at least one STA for transmitting the feedback frame. An LTF may be transmitted through at least one space-time stream through the NDP 410, and the STA may transmit to the AP a feedback frame including channel state information measured on the basis of the LTF of an indicated space-time stream and an indicated frequency domain.

Alternatively, the NDPA frame 400 and the NDP 410 may be transmitted based on a DL MU transmission method. More specifically, the NDPA frame 400 and the NDP 410 may be transmitted to a plurality of STAs through different space-time streams on the basis of DL MU MIMO transmission, or may be transmitted to the plurality of STAs through different frequency resources (or a subband, a channel) on the basis of DL MU OFDMA. In this case, the NDPA frame 400 and the NDP 410 transmitted through the different space-time streams or the different frequency resources may include different information. That is, the AP may transmit a plurality of NDPA frames respectively to the plurality of STAs, and may transmit a plurality of NDPs respectively to the plurality of STAs. For example, the NDPA frame transmitted through a specific space-time stream or a specific frequency resource may indicate only a specific STA for transmitting a feedback frame.

Hereinafter, an embodiment of the present invention is described for convenience of explanation by assuming a case where an NDPA frame and an NDP are transmitted to at least one STA through at least one stream on the basis of a non-duplicate PPDU format or a duplicate PPDU format.

The STA may perform channel estimation on the basis of the NDP 410, and may transmit acquired channel state information to the AP through the feedback frame 420. A channel bandwidth used for transmission of the feedback frame 420 may be set to be narrower than or equal to a channel bandwidth used for transmission of the NDPA frame 400. The feedback frame 420 may include channel state information (or stream state information) for each of an indicated space-time stream (or spatial stream).

If the NDP 410 is not transmitted based on beamforming, the feedback frame 420 may include a high throughput (HT) control field and a channel information control field (e.g., very high throughput (VHT) MIMO control field or an HE MU control field). The HT control field may include information regarding Nsts (the number of space-time streams), MCS, bandwidth (BW), and SNR. The control information control field may be reserved.

If the NDP 410 is transmitted based on beamforming, the feedback frame 420 may include an HT control field, a channel information control field, and a channel information field. The HT control field may include information regarding Nsts, MCS, BW, and SNR. The channel control field may include information regarding Nc, Nr, Ng, etc., and/or control information for OFDMA-based transmission. The channel information control field may include SNR information per stream, information of a beamforming feedback matrix for each subcarrier, SNR information for each frequency resource (e.g., subband) in OFDMA-based transmission, etc.

A format of the NDPA frame 400, the NDP 410, and the feedback frame 420 is described later in detail.

According to the embodiment of the present invention, upon receiving the NDAP 410, the STA may transmit the feedback frame 420 to the AP after a specific time (e.g., SIFS). The AP may receive the feedback frame 420, and after the specific time (e.g., SIFS), may transmit a downlink frame 430 to the STA on the basis of SU MIMO (or OFDMA/MU-MIMO). The AP may transmit the downlink frame 430 generated based on channel variation information determined by considering channel state information included in the feedback frame 420.

The STA may transmit an ACK or a block ACK to the AP in response to the received downlink frame 430.

If the downlink frame 430 transmitted by the AP receives the feedback frame 420 and is transmitted after the SIFS, a feedback channel state parameter (e.g., Nsts, MCS, BW, SNR, Nc, Nr, Ng, SNR information per stream, information of a beamforming feedback matrix for each subcarrier, SNR information for each frequency resource (e.g., subband) in OFDMA-based transmission, etc.) is relatively accurate, and thus data transmission efficiency may be increased.

Hereinafter, FIG. 5 to FIG. 7 disclose the NDPA PPDU and NPD 410 for carrying the NDPA frame 400 to perform the sounding procedure and the feedback PPDU for carrying the feedback frame 420 in detail according to an embodiment of the present invention.

Figure 5:
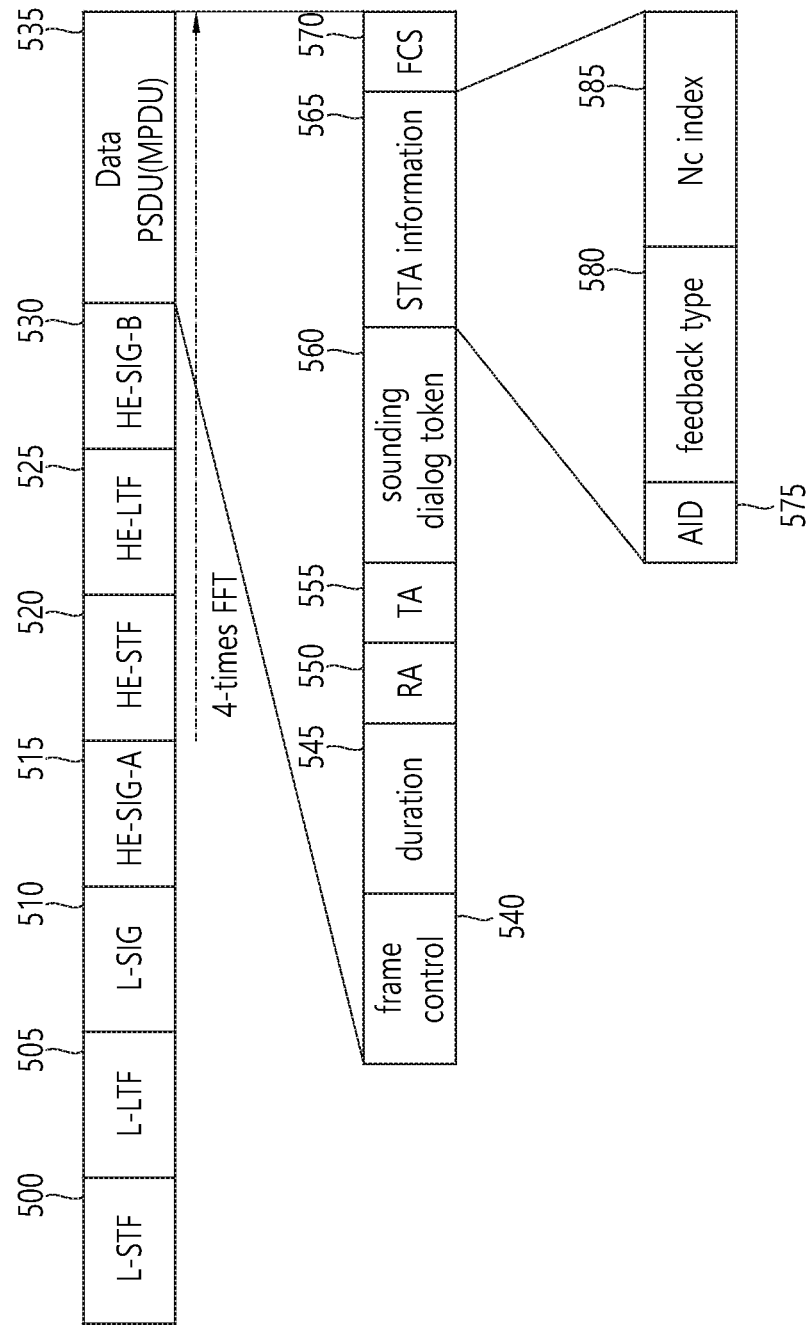
FIG. 5 is a concept view illustrating a format of a null data packet announcement (NDPA) PLCP protocol data unit (PPDU) according to an embodiment of the present invention.

FIG. 5 is a concept view illustrating a format of an NDPA PPDU according to an embodiment of the present invention.

Referring to an upper part of FIG. 5, the NDPA PPDU may include a PPDU header and a PSDU (or MPDU). The PPDU header used herein may include a PHY preamble and a PHY header. A PSDU (or MPDU) of the NPDA PPDU may include an NDPA frame.

The PPDU header of the NDPA PPDU may include a legacy-short training field (L-STF) 500, a legacy-long training field (L-LTF) 505, a legacy-signal (L-SIG) 510, a high efficiency-signal A (HE-SIG A) 515, a high efficiency-short training field (HE-STF) 520, a high efficiency-long training field (HE-LTF) 525, and a high efficiency-signal B (HE-SIG B) 530. The PHY header may be divided into a legacy part before the L-SIG 510 and a high efficiency (HE) part after the L-SIG 510.

The L-STF 500 may include a short training orthogonal frequency division multiplexing (OFDM) symbol. The L-STF 500 may be used for frame detection, automatic gain control (AGC), diversity detection, and coarse frequency/time synchronization.

The L-LTF 505 may include a long training OFDM symbol. The L-LTF 505 may be used for fine frequency/time synchronization and channel prediction.

The L-SIG 510 may be used to transmit control information. The L-SIG 510 may include information for a data rate and a data length.

The HE-SIG A 515 may include information indicating an STA for receiving a PPDU. More specifically, the HE-SIG A 515 may include information indicating an STA for receiving an NDPA frame.

In addition, the HE-SIG A 515 may include color bits information for BSS identification information, bandwidth information, a tail bit, a CRC bit, modulation and coding scheme (MCS) information for the HE-SIG B 530, symbol count information for the HE-SIG B 530, and cyclic prefix (CP) (or guard interval (GI)) length information.

The HE-STF 520 may be used to improve automatic gain control estimation in a multiple input multiple output (MIMO) environment or an OFDMA environment.

The HE-LTF 525 may be used to estimate a channel in the MIMO environment or the OFDMA environment.

The HE-SIG B 530 may include a length of physical layer service data unit (PSDU) for each STA, information regarding modulation and coding scheme (MCS), a tail bit, or the like.

A size of inverse fast Fourier transform (IFFT) applied to the HE-STF 520 and a field which comes after the HE-STF 520 may be different from a size of IFFT applied to a field which comes before the HE-STF 520. For example, the size of IFFT applied to the HE-STF 520 and the field which comes after the HE-STF 520 may be four times greater than the size of IFFT applied to the field which comes before the HE-STF 520. The STA may receive the HE-SIG A 515, and may be instructed to receive a downlink PPDU on the basis of the HE-SIG A 515. In this case, the STA may perform decoding on the HE-STF 520 and the field which comes after the HE-STF 520 on the basis of a changed FFT size. On the contrary, if the STA is not instructed to receive the downlink PPDU on the basis of the HE-SIG A 515, the STA may stop decoding and may configure a network allocation vector (NAV). A cyclic prefix (CP) of the HE-STF 520 may have a size greater than a CP of another field, and for this CP duration, the STA may perform decoding on the downlink PPDU by changing the FFT size.

An order of a field constructing the aforementioned NDPA PPDU format may be changed.

For example, an HE-SIG B of an HE part may be located immediately after an HE-SIG A. That is, each field of the HE part may be located in the order of HE-SIG A, HE-SIG B, HE-STF, HE-LTF. The STA may perform decoding on the HE-SIG and up to the HE-SIG B, may receive necessary control information, and may configure an NAV. Likewise, a size of IFFT applied to an HE-STF and a field which comes after the HE-STF may be different from a size of IFFT applied to a field which comes before the HE-STF. The STA may receive the HE-SIG A and the HE-SIG B. If it is instructed to receive the downlink PPDU by the STA identifier field of the HE-SIG A, the STA may perform decoding on the downlink PPDU starting from the HE-STF by changing the FFT size. On the contrary, the STA may receive the HE-SIG A, and if it is not instructed to receive the downlink PPDU on the basis of the HE-SIG A, may configure the NAV.

A PSDU (or MPDU) 535 of the NDPA PPDU may include the NDPA frame. The NDPA frame may include a frame control field 540, a duration field 545, an RA field 550, a TA field 555, a sounding dialog token field 560, an STA information field 565, and an FCS 570.

The frame control field 540 may include a type and subtype for indicating the NDPA frame.

The duration field 545 may include information regarding a duration for protecting transmission of the NDPA frame.

The RA field 550 may include identification information of an STA for receiving the NDPA frame. For example, when the STA information field includes information regarding a single STA, the RA field 550 may include address information of the STA. If the STA information field 565 includes information regarding a plurality of STAs, the RA field 550 may include a broadcast address of the STA. For example, the RA field 550 may include MAC address information of the STA for receiving the NDPA frame.

The TA field 555 may include an address of an AP for transmitting the NDPA frame.

The sounding dialog token field 560 may include information used by the AP for transmitting the NDPA frame to identify the NDPA frame.

The STA information field 565 may include identification information (AID) 575, feedback type information 580, and Nc index information 585 of the STA for receiving the NDPA frame.

Table 2 below discloses information included in the STA information field.

TABLE 2

| Subfield | Description |
| --- | --- |
| AID | AID (assoication identifier) of STA for performing sounding procedure (for receiving NDP to be transmitted later) is included |
| Feedback type | Indicate feedback request type of STA for performing souding procedure<br>Set to '0' in case of SU-MIMO<br>Set to '1' in case of MU-MIMO |
| Nc index | Inidicate requested feedback dimension (information regarding the number of columns of beamforming feedback matrix)<br>In case of MU-MOMO:<br>Set to '0' if Nc = 1<br>Set to '1' if Nc = 2<br>Set to '2' if Nc = 3<br>Set to '3' if Nc = 4<br>Set to '4' if Nc = 5<br>Set to '5' if Nc = 6<br>Set to '6' if Nc = 7<br>Set to '7' if Nc = 8<br>In case of SU-MIMO, reserved subfield (Set to 0) |

In Table 2, Nc may indicate the number of columns of beamforming feedback matrices included in a feedback frame transmitted in response to an NDP.

Upon receiving an NDPA frame, STAs may confirm an AID sub-field value included in an STA information field, and may confirm whether it is a sounding target STA.

FIG. 5 is one example for an NDPA PPDU. The NDPA PPDU may have the legacy PPDU format (e.g., an HT PPDU format, a VHT PPDU format) instead of the HE-SIG A 515, the HE-STF 520, the HE-LTF 525, and the HE-SIG B 530.

Figure 6:
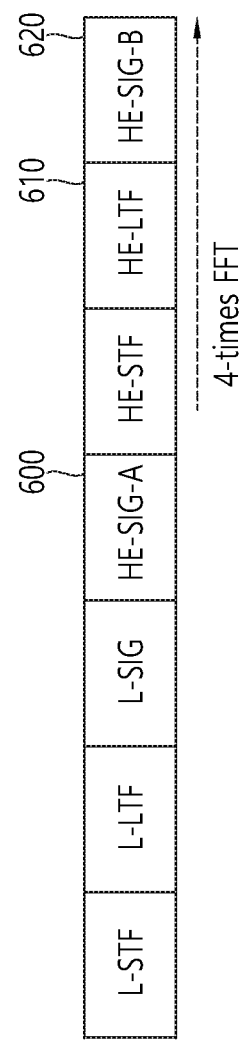
FIG. 6 is a concept view illustrating a null data packet (NDP) according to an embodiment of the present invention.

FIG. 6 is a concept view illustrating an NDP according to an embodiment of the present invention.

Referring to FIG. 6, the NDP may include only a PPDU header except for a PSDU (or MPDU).

As described above, the NDP (or PPDU header) may include a legacy part and a non-legacy part. Each field included in the legacy part and the non-legacy part may perform a role described above in FIG. 5 for transmission of the NDP.

For example, an HE-SIG A 600 may include information indicating an STA for receiving the NDP.

An HE-LTF 610 may be used for channel estimation of the STA. That is, the STA may perform channel estimation on the basis of the HE-LTF 610 included in the NDP frame, and may generate a feedback frame on the basis of a result of the channel estimation.

An HE-SIG B 620 may include information which indicates a PSDU length of 0.

As described above in FIG. 5, an order of some fields included in the aforementioned NDP may be changed. That is, each field of the PPDU header may be located in the order of HE-SIG A, HE-SIG B, HE-STF, and HE-LTF.

Figure 7:
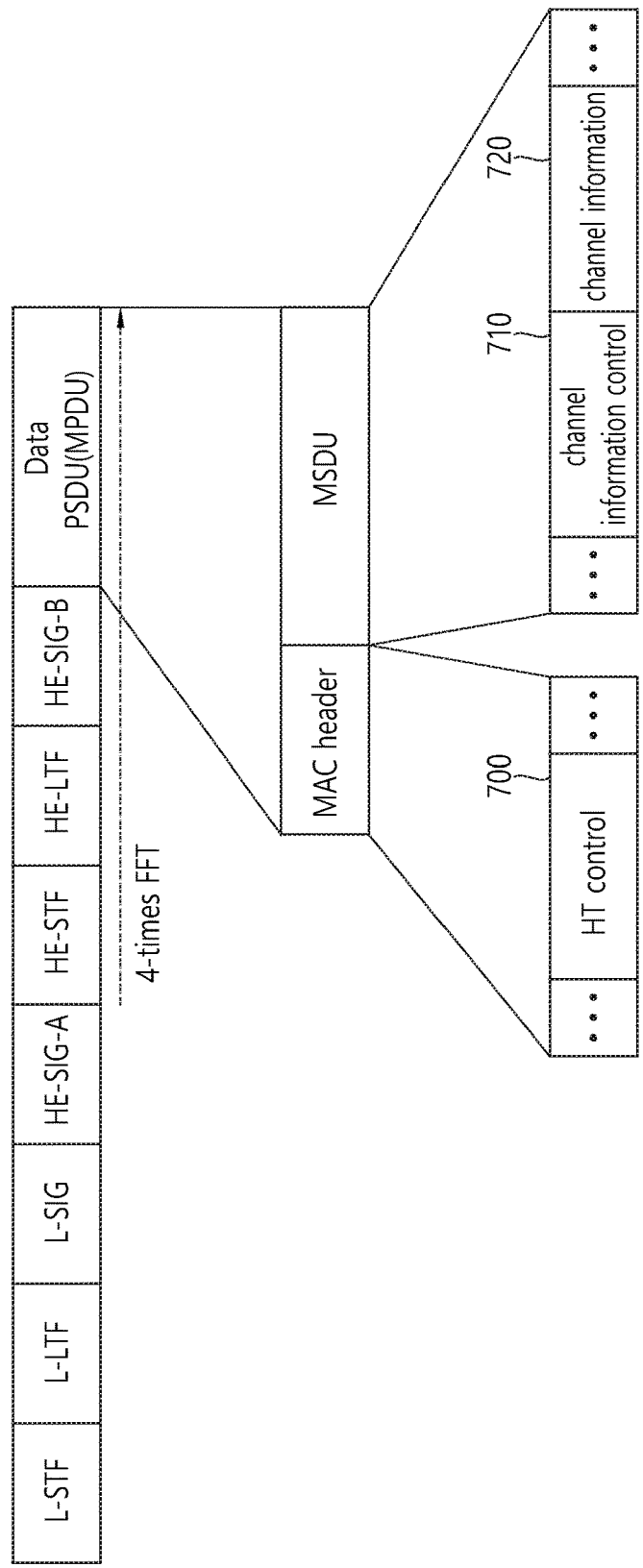
FIG. 7 is a concept view illustrating a feedback PPDU according to an embodiment of the present invention.

FIG. 7 is a concept view illustrating a feedback PPDU according to an embodiment of the present invention.

Referring to FIG. 7, the feedback PPDU may include a PPDU header and a PSDU (or MPDU). The PSDU (or MPDU) of the feedback PPDU may include a feedback frame.

The PPDU header of the feedback PPDU may include a legacy part and a non-legacy part. Each field included in the legacy part and the non-legacy part may perform a role described above in FIG. 5 for the feedback PPDU.

A MAC header of the feedback frame may include an HT control field 700, and the MSDU may include a channel information control field 710 and a channel information field 720. If beamforming is not used in the sounding procedure as described above, the channel information control field 710 and the channel information field 720 may not be included in the feedback frame or may be reserved, and the feedback frame may include only the HT control field 700. Only when the beamforming is used in the sounding procedure, the feedback frame may include the channel information control field 710 and the channel information field 720.

The HT control field 710 may include an MCS feedback (MFB) field. The MFB field may include information N STS regarding the number of recommended space-time streams, information MCS regarding a recommended MCS index, information BW regarding a bandwidth size intended by a recommended MCS, and information regarding an average SNR measured on all space-time streams and subcarriers for transmitting data.

Table 3 and Table 4 show a format of the channel information control field 710 and the channel information field 720.

Table 3 below discloses information included in the channel information control field 710.

TABLE 3

| Subfield | Description |
|---|---|
| Nc index | Inidicate a value obtained by subtracting 1 from the number Nc of columns of a beamforming feedback matrix<br>Set to 0 if Nc = 1<br>Set to 1 if Nc = 2<br>. . .<br>Set to 7 if Nc = 8 |
| Nr index | Inidicate a value obtained by subtracting 1 from the number Nrc of rows of a beamforming feedback matrix<br>Set to 0 if Nc = 1<br>Set to 1 if Nc = 2<br>. . .<br>Set to 7 if Nc = 8 |
| Channel bandwidth | Indicate a size of a channel bandwidth measured for generation of a beamforming feedback matrix<br>Set to 0 if 20 MHz<br>Set to 1 if 40 MHz<br>Set to 2 if 80 MHz<br>Set to 3 if 160 MHz or 80 + 80 MHz |
| Grouping, Ng | Inidicate subcarrier grouping used for a beamforming feedback matrix<br>Set to 0 if Ng = 1 (no grouping)<br>Set to 1 if Ng = 2<br>Set to 2 if Ng = 4<br>(3 is reserved) |
| Codebook information | Inidicate a size of codebook entries |
| Feedback type | Inidicate whether it is beamforming feedback for SU-MIMO or beamforming feedback for MU-MIMO |
| Sounduing sequence | Sequency number from NDPA for requesting feedback |

Table 4 below describes information included in the channel information field 720.

TABLE 4

| Subfield | Description |
|---|---|
| SNR(signal to noise ratio) of spatial stream 1 | Average SNR on subcarriers in recipient for spatial stream 1 |
| . . . | . . . |
| SNR of spatial stream Nc | Average SNR on subcarriers in recipient for spatial stream Nc |
| Beamforming feedback matrix (subcarrier index 0) | Order of angles for determining beamforming feedback matrix for corresponding subcarrier |
| Beamforming feedback matrix (subcarrier index 1) | Order of angles of beamforming feedback matrix for corresponding subcarrier |
| . . . | . . . |
| Beamforming feedback matrix (subcarrier index Ns) | Order of angles of beamforming feedback matrix for corresponding subcarrier |
| SNR(signal to noise ratio) of subband 1 | Average SNR on subcarrier included in subband 1 in recipient |
| . . . | . . . |
| SNR of subband Nk | Average SNR on subcarrier included in subband Nk in recipient |

Information of the channel information field 720 disclosed in Table 4 may be interpreted on the basis of information included in the channel control field 710 disclosed in Table 3. For example, the AP may receive a feedback frame, and a subcarrier index Ns may be determined on the basis of channel bandwidth information and grouping information of the channel information control field 710.

According to another embodiment of the present invention, in the grouping field Ng, a reserved 3(0x11) may be used for a subband-unit feedback. If the grouping field Ng is 3, it may indicate the subband-unit feedback. If Ng=3, an SNR or a beamforming feedback matrix (or a matrix vector) may be fed back in a subband unit. For example, a subband unit for a feedback may be fixed in unit of 26 tones or may be set to an additional unit (e.g., a tone corresponding to a multiple unit of 26 tones) on the basis of an additional subband related field.

In addition, an SNR or a beamforming feedback matrix (or a matrix vector) for a full frequency band may be transmitted through a feedback PPDU irrespective of whether grouping is achieved.

In addition, an Nc index count may be defined as not being singular (e.g., Nc) but being plural (e.g., $Nc_1$, $Nc_2$, etc.), and thus a plurality of pieces of feedback information corresponding to the plurality of Nc may be included in the feedback frame.

Figure 8:
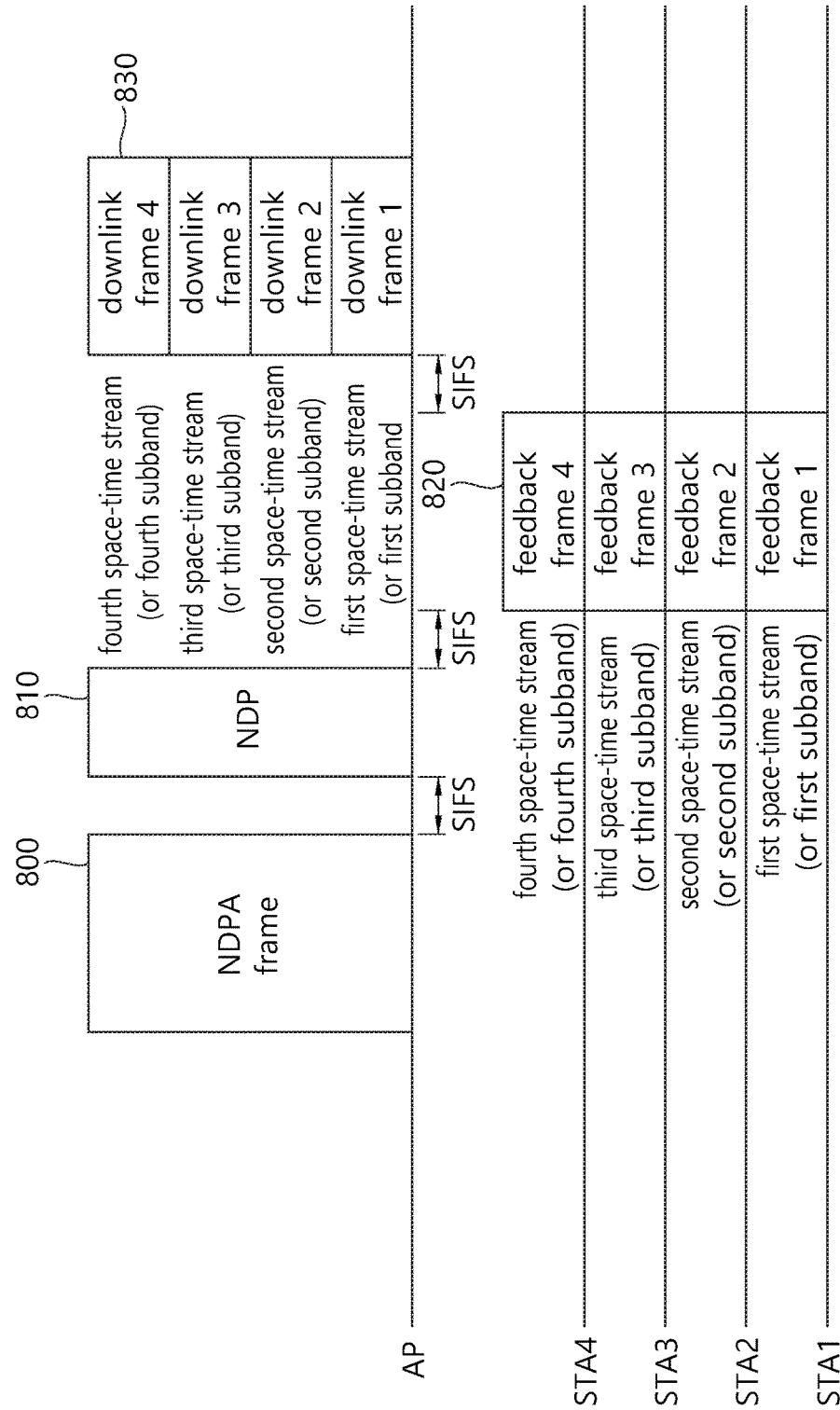
FIG. 8 is a concept view illustrating a method of transmitting a frame on the basis of a sounding procedure according to an embodiment of the present invention.

FIG. 8 is a concept view illustrating a method of transmitting a frame on the basis of a sounding procedure according to an embodiment of the present invention.

Disclosed in FIG. 8 is a method of transmitting a frame on the basis of a sounding procedure for a plurality of STAs. The sounding procedure disclosed in FIG. 8 is in particular for a case where a DL MU transmission method and a UL MU transmission method are both supported.

An AP may transmit an NDPA frame 800 to the STA for the sounding procedure, and may transmit an NDP 810 after a specific time (e.g., SIFS).

The NDPA frame 800 and the NDP 810 may be transmitted in a non-duplicate format or a duplicate format in a full transmission band for the NDPA frame 800 and the NDP 800 as described above in FIG. 4.

The NDPA frame 800 and NDP 810 of the non-duplicate PPDU format or the duplicate PPDU format may be transmitted to at least one STA through at least one stream. If the AP receives a feedback from the plurality of STAs as shown in FIG. 8, the AP may transmit the NDPA frame 800 and the NDP 810 to the plurality of STAs through a plurality of space-time streams. The NDPA frame 800 may indicate the plurality of STAs for transmitting the feedback frame. The NDP 810 may be used to transmit an LTF through the plurality of space-time streams, and each of the plurality of STAs may transmit to the AP the feedback frame including channel state information measured on the basis of the LTF of an indicated space-time stream and an indicated frequency domain.

The NDP 810 may indicate UL MU transmission of the feedback frame by the plurality of STAs. Each of the plurality of STAs may transmit the feedback frame to the AP after a specific time (e.g., SIFS) from the reception of the NDP 810. Each of the plurality of STAs may receive the NDPA frame 800 and the NDP 810, and may transmit a feedback frame 820 to the AP on the basis of the UL MU transmission method. For example, each of the plurality of STAs may transmit the feedback frame on an overlapping time resource through an allocated space-time stream or a frequency resource.

The AP may receive the feedback frame 820 transmitted based on UL MU transmission from each of the plurality of STAs. That is, the AP may receive each of a plurality of feedback frames transmitted respectively through a plurality of transmission resources respectively allocated to the plurality of STAs on the overlapping time resource respectively by the plurality of STAs.

The AP may receive the feedback frame 820 by considering channel state information included in the feedback frame 820, and then, after a specific time (e.g., SIFS), may transmit a downlink frame 830 (e.g., a downlink data frame, a downlink management frame, etc.) to each of the plurality of STAs on the basis of the DL MU transmission method. That is, the AP may transmit a plurality of downlink frames respectively to the plurality of STAs. Each of the plurality of feedback frames may include channel state information determined on the basis of the NDP 810. The plurality of downlink frames may be transmitted respectively based on a plurality of pieces of channel state information within a specific time (e.g., SIFS) after respectively receiving the plurality of feedback frames.

Each of the plurality of STAs may receive the downlink frame 830, and may transmit an ACK or a block ACK to the AP in response to the downlink frame 830 on the basis of the UL MU transmission.

Although the downlink frame 830 may be transmitted based on DL MU to each of all STAs which transmit the feedback frame 820, the downlink frame 830 may also be transmitted to some STAs among the all STAs which transmit the feedback frame 820. For example, the AP may not transmit the downlink frame 830 for the some STAs among the all STAs which transmit the feedback frame 820 by considering the channel state information included in the feedback frame 820. In this case, the AP may indicate an STA for receiving the downlink frame 830 on the basis of a downlink PPDU for carrying the downlink frame 830. For example, an HE-SIG A field included in a PPDU header of the downlink PPDU may include information indicating the receiving STA. The information indicating the STA for receiving the downlink PPDU may be an index for indexing STA AIDs included in the NDPA frame 800 in an orderly manner. For example, a first AID may be mapped to an index 0, and a second AID may be mapped to an index 1. The STA for receiving the downlink PPDU may be indicated on the basis of an index value corresponding to the AID included in the downlink PPDU. Alternatively, the STA for receiving the downlink frame 830 may be indicated on the basis of a group ID.

Figure 9:
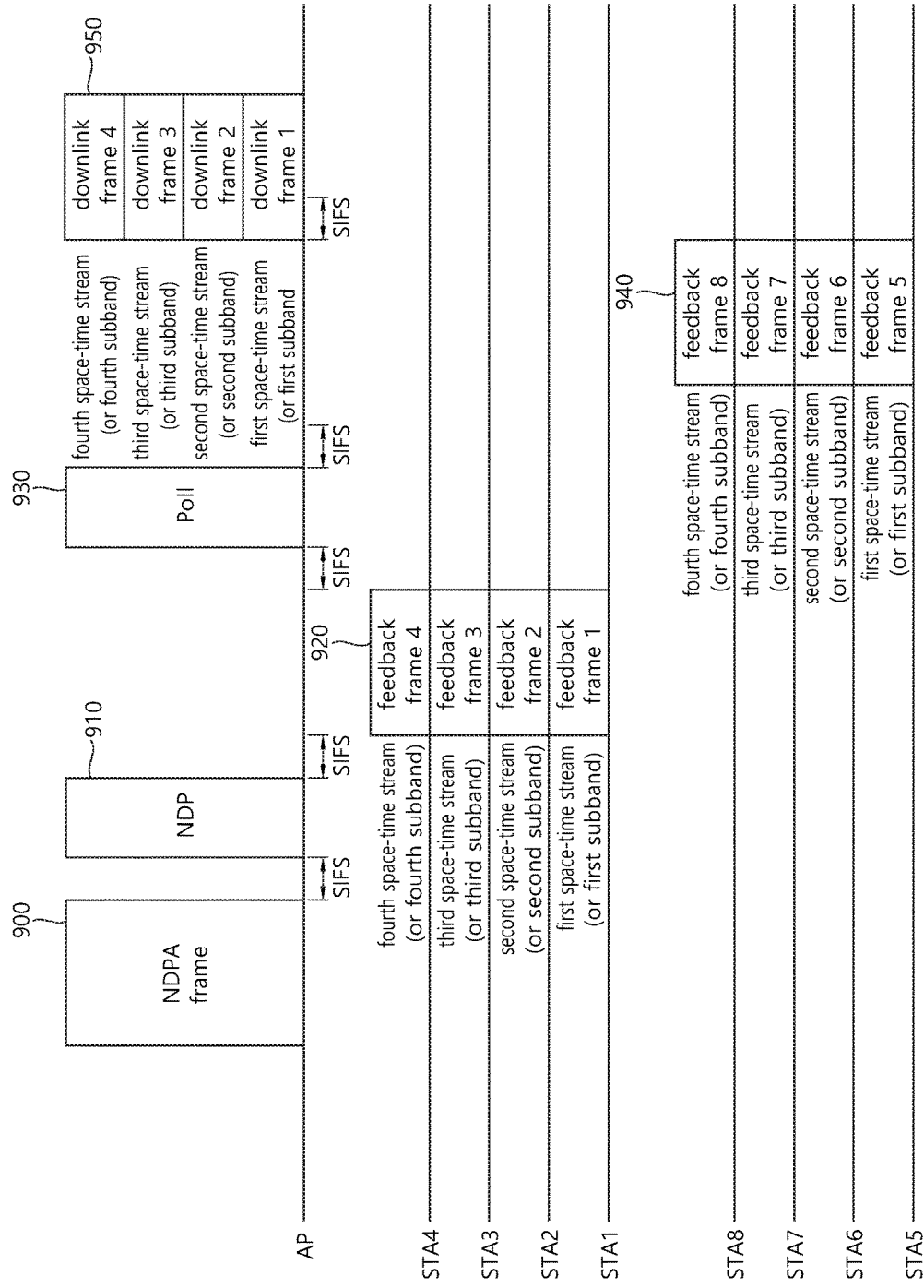
FIG. 9 is a concept view illustrating a method of transmitting a frame on the basis of a sounding procedure according to an embodiment of the present invention.

FIG. 9 is a concept view illustrating a method of transmitting a frame on the basis of a sounding procedure according to an embodiment of the present invention.

Disclosed in FIG. 9 is a method of transmitting a frame on the basis of a sounding procedure for a plurality of STAs. In particular, disclosed is a case where DL MU transmission and UL MU transmission are both supported and the number of STAs instructed to transmit a feedback frame is greater than the maximum number of STAs capable of performing transmission based on UL MU transmission.

An AP may transmit an NDPA frame 900 to the STA for the sounding procedure, and may transmit an NDP 910 after a specific time (e.g., SIFS).

The NDPA frame 900 and NDP 910 of the non-duplicate PPDU format or the duplicate PPDU format may be transmitted to at least one STA through at least one stream. If the AP receives a feedback from the plurality of STAs as shown in FIG. 9, the AP may transmit the NDPA frame 900 and the NDP 910 to the plurality of STAs through a plurality of space-time streams. The NDPA frame 900 may indicate the plurality of STAs for transmitting the feedback frame. The NDP 910 may be used to transmit an LTF through the plurality of space-time streams, and each of the plurality of STAs may transmit to the AP the feedback frame including channel state information measured on the basis of an LTF of an indicated space-time stream and an indicated frequency domain.

The NDPA frame 900 may instruct transmission of feedback frames 920 and 940 by using more STAs than the maximum number of STAs capable of performing transmission on the basis of UL MU transmission. For example, the number of STAs indicated on the basis of the STA information field of the NDPA frame 900 may be greater than the maximum number of STAs capable of performing transmission based on UL MU transmission.

The NDP 910 may indicate UL MU transmission of the feedback frame 920 by the plurality of STAs. The NDP 910 may be received by the greater number of STAs than the number of STAs capable of performing transmission based on UL MU transmission.

Since transmission of the feedback frame is requested to the greater number of STAs than the number of STAs capable of performing transmission based on UL MU transmission, the AP may receive the feedback frame from the plurality of STAs on the basis of polling. For example, if the number of STAs instructed to perform the sounding procedure on the basis of the NDPA frame 900 is greater than N and the maximum number of STAs capable of performing transmission based on UL MU transmission is N, N STAs may receive the NDP 910, and after SIFS, may transmit the feedback frame 920 on the basis of UL MU transmission. The remaining STAs may transmit the feedback frame 940 on the basis of a polling frame 930 transmitted by the AP.

A transmission priority of the feedback frames 920 and 940 may be determined on the basis of an AID of an STA information field included in the NDPA frame 900. For example, a plurality of STAs corresponding to N AIDs preferentially included among AIDs of the STA information field may preferentially transmit the feedback frame 920 to the AP after receiving the NDP 910. STAs corresponding to the remaining AIDs may receive the polling frame 930 from the AP, and may transmit the feedback frame 940 to the AP.

The AP may transmit a downlink frame 950 on the basis of the DL MU transmission method for all (if the number of STAs capable of performing UL MU transmission is greater than or equal to the number of STAs for transmitting feedback information) or some (if the number of STAs capable of performing DL MU transmission is less than the number of STAs for transmitting feedback information) of the plurality of STAs on the basis of the feedback frames 920 and 940 received from the plurality of STAs.

A PPDU header of a downlink PPDU for carrying a downlink frame transmitted based on DL MU transmission may indicate an STA for receiving a downlink PPDU. Therefore, a plurality of STAs for transmitting a feedback frame may determine whether to receive (or additionally decode) the downlink frame 950 on the basis of PPDU header information of the downlink PPDU for carrying the downlink frame 950.

Figure 10:
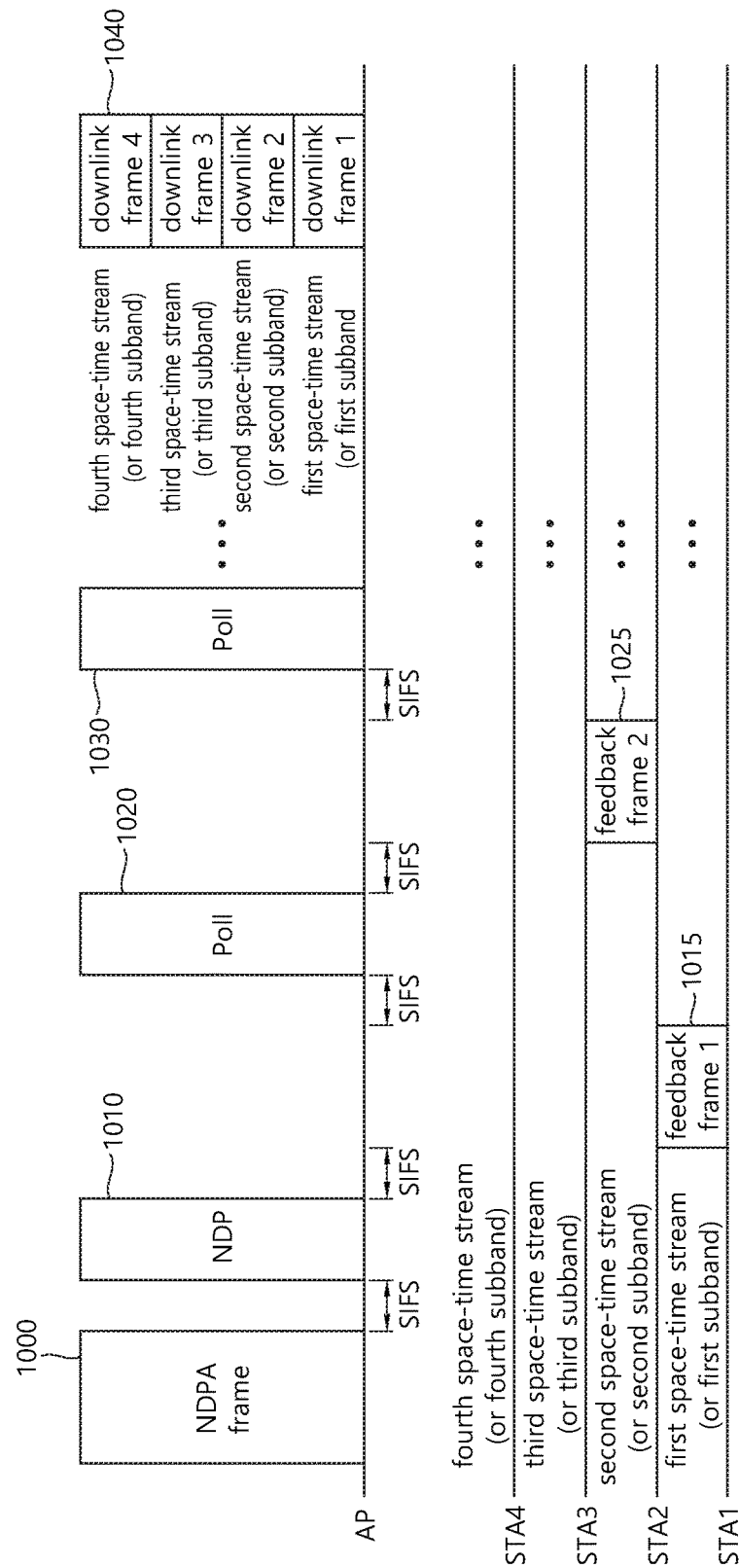
FIG. 10 is a concept view illustrating a method of transmitting a frame on the basis of a sounding procedure according to an embodiment of the present invention.

FIG. 10 is a concept view illustrating a method of transmitting a frame on the basis of a sounding procedure according to an embodiment of the present invention.

Disclosed in FIG. 10 is a method of transmitting a frame on the basis of a sounding procedure for a plurality of STAs. In particular, disclosed in FIG. 10 is a case where only a DL MU transmission method is supported.

An AP may transmit an NDPA frame 1000 to the STA for the sounding procedure, and may transmit an NDP 1010 after a specific time (e.g., SIFS).

The NDPA frame 1000 and NDP 1010 of the non-duplicate PPDU format or the duplicate PPDU format may be transmitted to at least one STA through at least one stream. If the AP receives a feedback from the plurality of STAs as shown in FIG. 10, the AP may transmit the NDPA frame 1000 and the NDP 1010 to the plurality of STAs through a plurality of space-time streams. The NDPA frame 1000 may indicate the plurality of STAs for transmitting the feedback frame. The NDP 1010 may be used to transmit an LTF through the plurality of space-time streams, and each of the plurality of STAs may transmit to the AP the feedback frame including channel state information measured on the basis of an LTF of an indicated space-time stream and an indicated frequency domain. The NDP 1010 may instruct transmission of a feedback frame 1015 of a single STA among a plurality of STAs indicated based on the NDPA frame 1000. For example, an STA corresponding to a first AID among AIDs included in the STA information field of the NDPA frame 1000 may receive the NDP 1010, and after a specific time (e.g., SIFS), may transmit the feedback frame to the AP.

At least one STA corresponding to the remaining AIDs may sequentially receive polling frames 1020 and 1030 from the AP, and may transmit feedback frames 1015, 1025, or the like to the AP.

The AP may receive the feedback frames 1015, 1025, or the like from the plurality of STAs, and may determine channel variation information and transmit a downlink frame 1040 on the basis of the DL MU transmission method. The plurality of STAs for receiving the downlink frame 1040 transmitted based on the DL MU transmission method may be all or some parts of the plurality of STAs for transmitting the feedback frames 1015, 1025, or the like.

Figure 11:
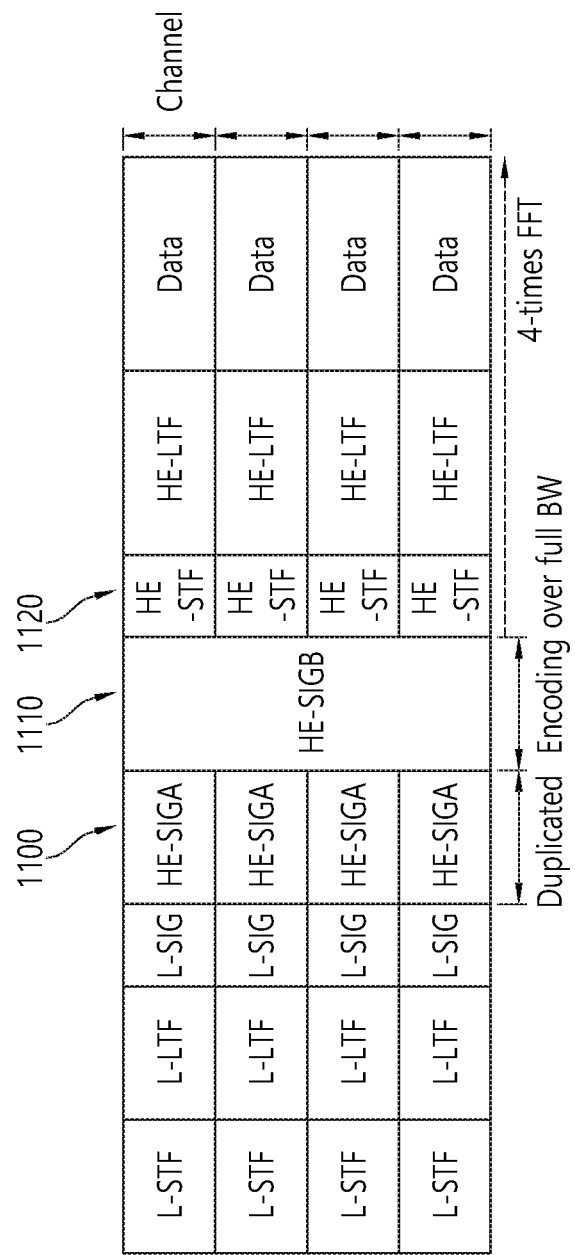
FIG. 11 is a concept view illustrating an NDPA PPDU format according to an embodiment of the present invention.
Figure 12:
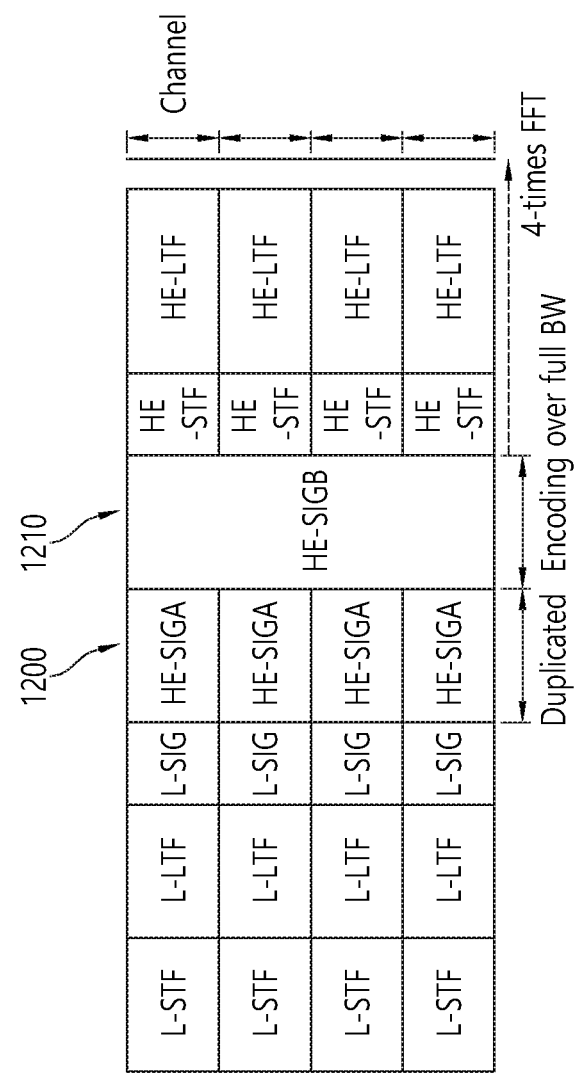
FIG. 12 is a concept view illustrating an NDP according to an embodiment of the present invention.

FIG. 11 and FIG. 12 disclose NDPA PPDU and NPD formats for carrying an NDPA frame to perform a sounding procedure in detail according to an embodiment of the present invention.

FIG. 11 is a concept view illustrating an NDPA PPDU format according to an embodiment of the present invention.

Disclosed in FIG. 11 is an NDPA PPDU transmitted to each of a plurality of STAs through a different downlink transmission resource (a frequency resource or a spatial stream). The NDPA frame transmitted through a different space-time stream or a different frequency resource may include different information.

The NDPA PPDU may be transmitted to a plurality of STAs through a full bandwidth allocated on the basis of a non-duplicate format, or may be transmitted to the plurality of STAs through a plurality of channels on the basis of a duplicate format. In this case, the aforementioned NDPA PPDU format of FIG. 5 is used, and an HE-SIG A field may indicate the plurality of STAs.

Referring to FIG. 11, a field which comes before an HE-SIG B 1110 on the NDPA PPDU may be transmitted in a duplicated form in each of different uplink transmission resources. The HE-SIG B 1110 may be transmitted on all transmission resources in an encoded form. A field which comes after the HE-SIG B 1110 may include individual information for each of the plurality of STAs for receiving the PPDU. For example, a field which comes after the HE-SIG B 1110 to be transmitted through a first transmission resource may include an STA information field indicating an STA1, and a field which comes after the HE-SIG B 1110 to be transmitted through a second transmission resource may include an STA information field indicating an STA2.

If the field included in the NDPA PPDU is transmitted through each of the downlink transmission resources, a CRC for each field may be included in the NDPA PPDU. On the contrary, if a specific field included in the NDPA PPDU is transmitted by being encoded on all downlink transmission resources, a CRC for each field may not be included in the NDPA PPDU. Therefore, an overhead for the CRC may be decreased. The NDPA PPDU may include the HE-SIG B 1110 having an encoded form on all transmission resources. When using the HE-SIG B 1110 in this format, a CRC overhead may be decreased.

An HE-SIG A 1100 of the NDPA PPDU may include information indicating a plurality of STAs for receiving the NDPA PPDU and/or information regarding transmission resources allocated respectively to the plurality STAs to receive respective NDPA PPDUs of the plurality of STAs. That is, the HE-SIG A 1100 may include information regarding the transmission resources allocated respectively to the plurality of STAs. Each of the plurality of STAs may receive the NDPA PPDU through a transmission resource indicated based on the HE-SIG A 1100.

Likewise, also in a NDPA PPDU format for DL MU transmission, an HE-STF 1120 and a field which comes after the HE-STF 1120 may be encoded on the basis of an IFFT size different from that of a field which comes before the HE-STF 1120. Therefore, the STA may receive an HE-SIG A 1100 and the HE-SIG B 1110, and if it is instructed to receive the NDPA PPDU on the basis of the HE-SIG A 1100, may perform decoding on the NDPA PPDU by changing an FFT size.

The downlink frame (downlink data frame, downlink management frame) transmitted based on UL MU transmission disclosed in the embodiment of the present invention may also be transmitted to the plurality of STAs on the basis of the same PPDU format as the NDPA PPDU format disclosed in FIG. 11.

FIG. 12 is a concept view illustrating an NDP according to an embodiment of the present invention.

Referring to an upper portion of FIG. 12, the NDP may include only a PPDU header except for a PSDU (or MPDU).

Disclosed in FIG. 12 is an NDP transmitted to each of a plurality of STAs through a different downlink transmission resource (a frequency resource or a spatial stream). The NDP transmitted through a different space-time stream or a different frequency resource may include different information.

As described above, the NDP (or PPDU header) may include a legacy part and a non-legacy part. Each field included in the legacy part and the non-legacy part may perform a role described above in FIG. 5.

A field which comes before an HE-SIG B 1210 in the NDP may be transmitted in a duplicated form in each of different uplink transmission resources. The HE-SIG B 1210 may be transmitted on all transmission resources in an encoded form. A field which comes after the HE-SIG B 1210 may include individual information for each of the plurality of STAs for receiving the PPDU.

For example, an HE-SIG A 1200 may include information indicating a plurality of STAs for receiving the NDP and information regarding transmission resources allocated respectively to the plurality of STAs. Each of the plurality of STAs may receive the NDP through a transmission resource indicated based on the HE-SIG A.

Each of the plurality of STAs may receive an HE-LTF transmitted through the transmission resource indicated based on the indicated HE-SIG A 1200, and may perform channel estimation to generate feedback information.

Figure 13:
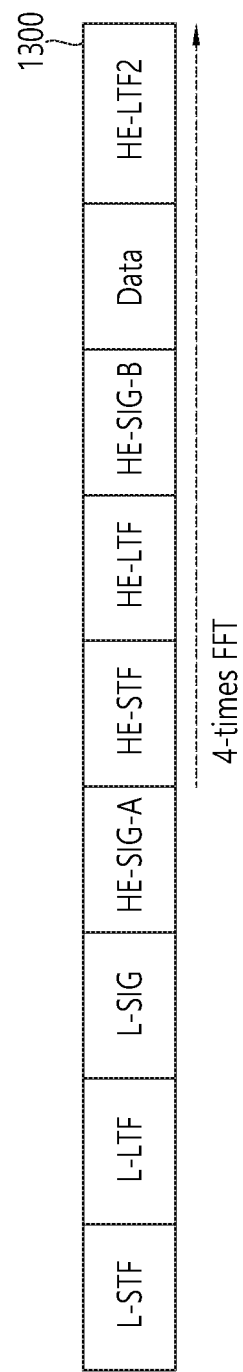
FIG. 13 is a concept view illustrating a PPDU format for a sounding procedure according to an embodiment of the present invention.

FIG. 13 is a concept view illustrating a PPDU format for a sounding procedure according to an embodiment of the present invention.

Disclosed in FIG. 13 is a sounding procedure based on a single PPDU.

Referring to FIG. 13, a new sounding PPDU may be defined in which the NDPA PPDU is followed by a training field (e.g., an HE LTF2 1300) added thereto for channel estimation. The new sounding PPDU in which the NDPA PPDU is followed by the training field 1300 added thereto for channel estimation may be defined by the term 'synthesized sounding PPDU'. If the synthesized sounding PPDU is used, additional NDP transmission may not be performed.

Alternatively, after the synthesized sounding PPDU is transmitted to secure a processing time for generating a feedback frame of the STA, the NDP may be transmitted with a format of a null frame not including the training field (e.g., HE-LTF). The STA may not perform additional decoding on the NDP, may generate channel state information based on the synthesized sounding PPDU, and may transmit the generated channel state information by including it to the feedback frame.

Figure 14:
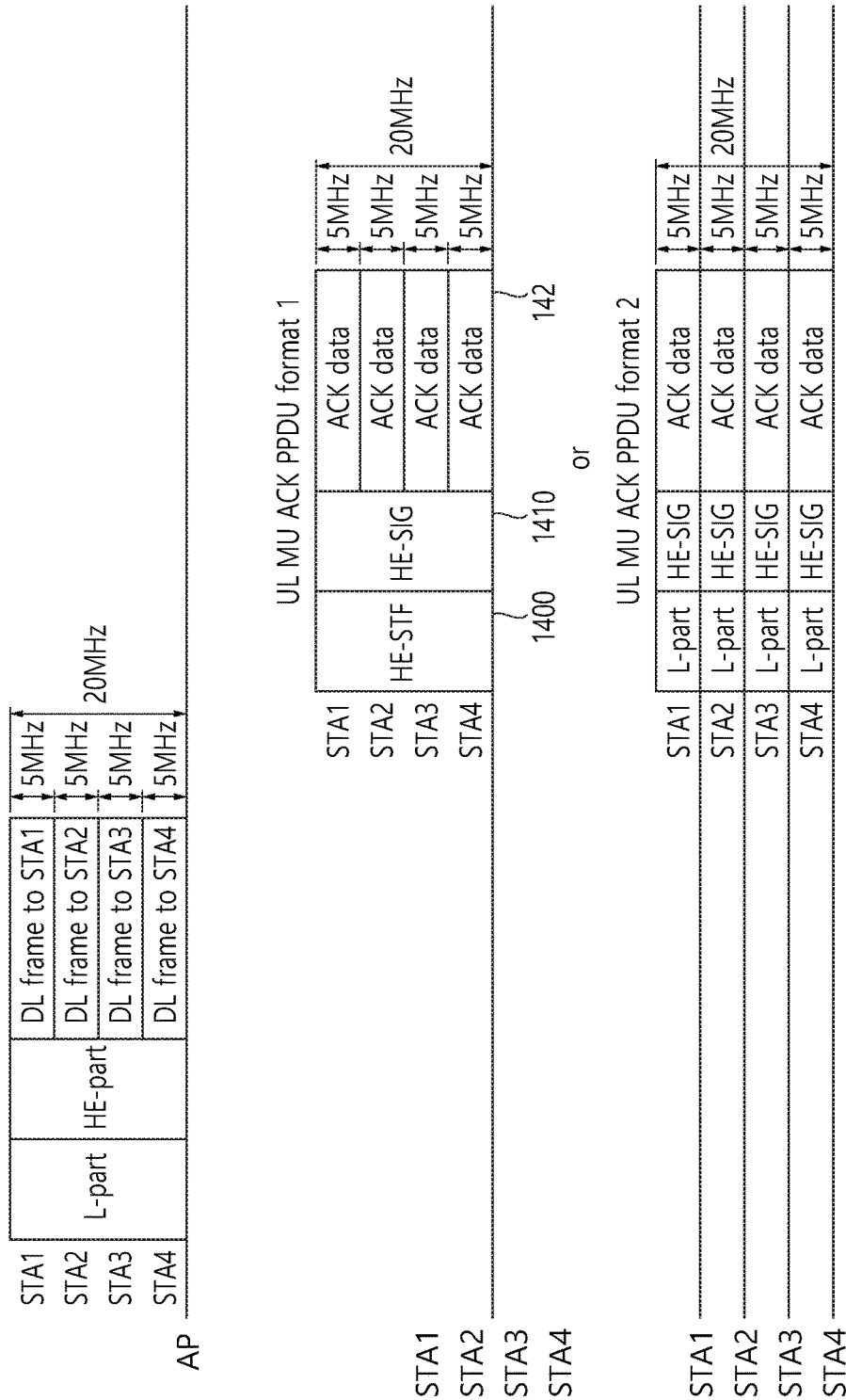
FIG. 14 is a concept view illustrating a PPDU format for carrying an acknowledgment (ACK) frame according to an embodiment of the present invention.

FIG. 14 is a concept view illustrating a PPDU format for carrying an ACK frame according to an embodiment of the present invention.

Disclosed in FIG. 14 is a PPDU for carrying an ACK frame based on UL MU. The ACK frame based on UL MU disclosed in FIG. 14 may be used to transmit an ACK or a block ACK based on UL MU of a plurality of STAs as described above.

Although it is assumed in FIG. 14 that a subband granularity is 5 MHz, a PPDU format for carrying the same ACK frame may be used by considering expansion or reduction on a frequency band also in a subband granularity of 20 MHz and 2.5 MHz. Respective subbands may be frequency resources that can be allocated respectively to STAs for OFDMA-based transmission.

Referring to FIG. 14, a frequency band of 20 MHz may include four 5 MHz subbands. Each of the four 5 MHz subbands may be used for OFDMA-based DL MU transmission to the plurality of STAs.

A UL MU ACK frame may be transmitted in response to a plurality of downlink PPDUs transmitted based on DL MU transmission.

A PPDU (UL MU ACK PPDU) for carrying a UL MU ACK frame may include an HE part. The HE part may include an HE-STF 1400, an HE-SIG field 1410, and an HE-ACK data field 1420. Alternatively, the UL MU ACK PPDU may include the HE part (the HE-STF 1400, the HE-SIG field 1410) as a PPDU header, and may include an ACK frame 1420 as a PSDU (or MPDU).

An OFDM symbol for transmission of each field included in the UL MU ACK PPDU may include an extended CP. Further, the UL MU ACK PPDU may include the legacy part (L-STF, L-LTF, and L-SIG), but may also have a format not including the legacy part as shown in FIG. 14. A length of the extended CP may be two times or four times longer than a length of a CP of an OFDM symbol for transmission of the HE-STF and HE-SIG included in a downlink PPDU transmitted through DL MU. By using a CP having a long length, a reception timing error may be compensated for between a plurality of uplink transmissions based on UL MU.

In a UL MU ACK PPDU, an HE-STF and an HE-SIG may be transmitted through an overlapping frequency resource (or a frequency band including all subbands) on an overlapping time resource, and the remaining ACK data (or ACK frames) may be transmitted through a frequency resource allocated for each STA. That is, the AP may receive a plurality of pieces of ACK data respectively for a plurality of downlink frames respectively through a plurality of transmission resources allocated respectively to a plurality of STAs on an overlapping time resource from the plurality of STAs. In this case, a training field and signal field for decoding of each of the plurality of pieces of ACK data may be transmitted through a plurality of transmission resources.

For example, referring to the UL MU ACK PPDU format 1, when assuming four subbands having a subband granularity of 5 MHz, each of an STA1 to an STA4 may transmit an HE-STF and an HE-SIG through a 20 MHz band which is a frequency band including a full subband, and may transmit ACK data through respective 5 MHz subbands allocated thereto.

Alternatively, in the UL MU ACK PPDU, the HE-STF, HE-SIG, and ACK data (or ACK frame) may be transmitted through an allocated frequency resource. For example, referring to the UL MU ACK PPDU format 2, when assuming four subbands having a subband granularity of 5 MHz, each of the STA1 to the STA4 may transmit the HE-STF, the HE-SIG, and the ACK data (or ACK frame) through the respective 5 MHz subbands allocated thereto.

This method may also be applied to a case where a downlink frame is transmitted and a UL MU ACK PPDU is transmitted based on DL MU MIMO transmission. The UL MU ACK PPDU transmitted in response to a downlink frame on the basis of DL MU MIMO transmission may be transmitted on the same bandwidth as a transmission bandwidth of the downlink frame. For example, if the downlink frame is transmitted based on DL MU MIMO transmission on 20 MHz, each of the plurality of STAs may transmit an ACK PPDU (or ACK frame) on the basis of UL MU MIMO transmission on 20 MHz.

In order for the plurality of STAs to transmit an ACK PPDU on the basis of UL MU MIMO transmission, an SIG field or control field of a downlink PPDU for carrying a downlink frame on the basis of DL MU MIMO transmission may include information for UL MU MIMO transmission. For example, information for the UL MU MIMO transmission may include resource allocation information (e.g., space-time stream indication information) used by each of the plurality of STAs to transmit an ACK frame.

Alternatively, the UL MU MIMO method to be used for transmission of the ACK frame of the plurality of STAs may be determined based on the DL MU MIMO method used for transmission of a downlink frame or may be determined by considering a predetermined (or agreed) method (e.g., a method determined in advance by an agreement or information signaled by a beacon frame).

Figure 15:
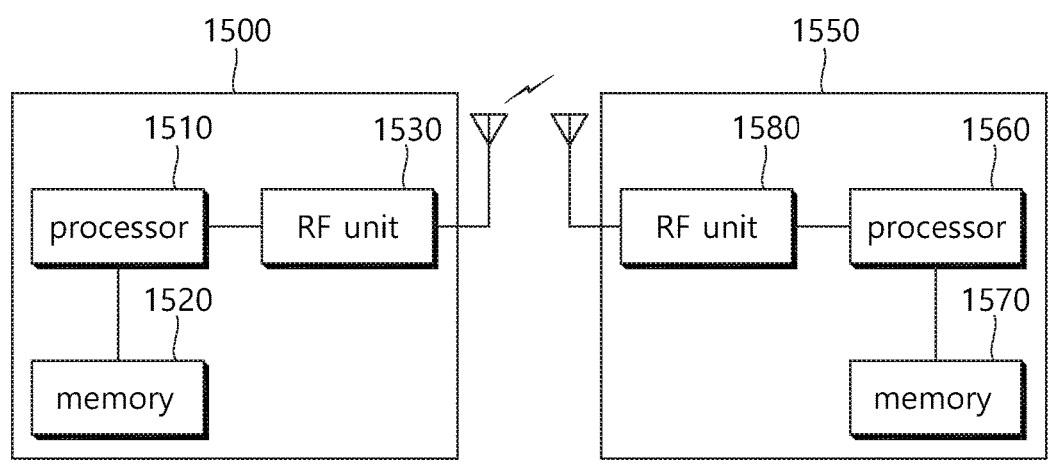
FIG. 15 is a block diagram of a wireless device according to an embodiment of the present invention.

FIG. 15 is a block diagram of a wireless device according to an embodiment of the present invention.

Referring to FIG. 15, a wireless device 1500 is an STA capable of implementing the aforementioned embodiment, and may be an AP 1500 or a non-AP STA (or STA) 1550.

The AP 1500 includes a processor 1510, a memory 1520, and a radio frequency (RF) unit 1530.

The RF unit 1530 may be coupled to the processor 1510 to transmit/receive a radio signal.

The processor 1510 may implement the functions, procedures, and/or methods proposed in the present invention. For example, the processor 1510 may be implemented to perform an operation of an AP according to the embodiment of the present invention described above. The processor may perform the operation of the AP in the embodiment of the FIG. 1 to FIG. 14.

For example, the processor 1510 may be implemented to transmit an NDPA frame (or each of a plurality of NDPA frames) to each of a plurality of STAs and to transmit an NDP (or each of a plurality of NDPs) to each of the plurality of STAs. The NDPA frame (or each of the plurality of NDPA frames) may report transmission of the NDP (or each of the plurality of NDPs).

Further, the processor 1510 may be implemented to receive a plurality of feedback frames transmitted respectively through a plurality of transmission resources allocated respectively to the plurality of STAs on an overlapping time resource respectively by the plurality of STAs, and to transmit a plurality of downlink frames respectively to the plurality of STAs. The plurality of feedback frames respectively include a plurality of pieces of channel state information determined on the basis of the NDP (or the plurality of NDPs respectively). The plurality of downlink frames may respectively receive the plurality of feedback frames and thereafter may be transmitted based on the plurality of respective pieces of channel state information within a specific time.

The STA 1550 includes a processor 1560, a memory 1570, and a radio frequency (RF) unit 1580.

The RF unit 1580 may be coupled with the processor 1560 to transmit/receive a radio signal.

The processor 1560 may implement the functions, procedures, and/or methods proposed in the present invention. For example, the processor 1560 may be implemented to perform an operation of an STA according to the embodiment of the present invention described above. The processor may perform the operation of the STA in the embodiment of the FIG. 1 to FIG. 14.

For example, by the use of the processor 1560, the STA may receive the NDP from the AP to perform channel estimation, and may transmit a feedback frame to the AP on the basis of a UL MU transmission method.

The processors 1510 and 1560 may include an application-specific integrated circuit (ASIC), a separate chipset, a logic circuit, a data processing unit, and/or a converter for mutually converting a baseband signal and a radio signal. The memories 1520 and 1570 may include a read-only memory (ROM), a random access memory (RAM), a flash memory, a memory card, a storage medium, and/or other equivalent storage devices. The RF units 1530 and 1580 may include one or more antennas for transmitting and/or receiving the radio signal.

When the embodiment of the present invention is implemented in software, the aforementioned methods can be implemented with a module (i.e., process, function, etc.) for performing the aforementioned functions. The module may be stored in the memories 1520 and 1570, and may be performed by the processors 1510 and 1560. The memories 1520 and 1570 may be located inside or outside the processors 1510 and 1560, and may be coupled to the processors 1510 and 1560 by using various well-known means.

What is claimed is:

1. A method of transmitting a frame based on a sounding procedure in a wireless local area network (WLAN), the method comprising:
   generating, by a transmitting station, a null data packet announcement (NDPA) frame initiating the sounding procedure,
   wherein the NDPA frame includes:
      a feedback type field indicating a single user feedback mode or a multi user feedback mode, and
      a feedback index field indicating a number of columns to be used for a beamforming feedback matrix;

transmitting, by the transmitting station, the NDPA frame;
transmitting, by the transmitting station, a null data packet (NDP) frame following the NDPA frame;
receiving, by the transmitting station, first feedback frames from first reporting stations,
wherein the first feedback frames are received based on an uplink multi-user operation, which enables the first feedback frames to be received by the transmitting station simultaneously, and
wherein each of the first feedback frames indicates a corresponding beamforming feedback matrix configured based on the feedback index field and a signal to noise ratio (SNR) for a corresponding wireless channel;
after receiving the first feedback frames, delaying, by the transmitting station, during a short inter-frame space (SIFS), and transmitting, by the transmitting station, a polling frame to second reporting stations immediately after the SIFS; and
receiving, by the transmitting station, second feedback frames from the second reporting stations,
wherein the second feedback frames are received based on the uplink multi-user operation, which enables the second feedback frames to be received by the transmitting station simultaneously, and
wherein each of the second feedback frames indicates a corresponding beamforming feedback matrix configured based on the feedback index field and a signal to noise ratio (SNR) for a corresponding wireless channel.

2. The method of claim 1, wherein frequency resources for the first feedback frames are separately allocated by the transmitting station.

3. The method of claim 1, wherein the polling frame indicates frequency resources allocated for the second feedback frames and identifiers of the second reporting stations.

4. The method of claim 1, wherein the NDP frame comprises a first physical layer protocol data unit (PPDU) part including a legacy training field and a legacy signal field and a second PPDU part including a high efficiency short training field (HE-STF) and a high efficiency long training field (HE-LTF) and does not comprise a protocol service data unit (PSDU) field, wherein the first PPDU part is configured by a first point fast Fourier transform (FFT) operation and the second PPDU part is configured by a second point FFT operation such that a subcarrier spacing of the second PPDU part is four times fewer than a subcarrier spacing of the first PPDU part.

5. A transmitting station for transmitting a frame based on a sounding procedure in a wireless local area network (WLAN), the transmitting station comprising:
a radio frequency (RF) unit implemented to transmit or receive a radio signal; and
a processor operatively coupled to the RF unit,
wherein the processor is configured to:
generate a null data packet announcement (NDPA) frame initiating the sounding procedure,
wherein the NDPA frame includes:
a feedback type field indicating a single user feedback mode or a multi user feedback mode, and
a feedback index field indicating a number of columns to be used for a beamforming feedback matrix;
transmit the NDPA frame;
transmit a null data packet (NDP) frame following the NDPA frame;
receive first feedback frames from first reporting stations,
wherein the first feedback frames are received based on an uplink multi-user operation, which enables the first feedback frames to be received by the transmitting station simultaneously, and
wherein each of the first feedback frames indicates a corresponding beamforming feedback matrix configured based on the feedback index field and a signal to noise ratio (SNR) for a corresponding wireless channel;
after receiving the first feedback frames, delay during a short inter-frame space (SIFS), and transmit a polling frame to second reporting stations immediately after the SIFS; and
receive second feedback frames from the second reporting stations,
wherein the second feedback frames are received based on the uplink multi-user operation, which enables the second feedback frames to be received by the transmitting station simultaneously, and
wherein each of the second feedback frames indicates a corresponding beamforming feedback matrix configured based on the feedback index field and a signal to noise ratio (SNR) for a corresponding wireless channel.

6. The transmitting station of claim 5, wherein frequency resources for the first feedback frames are separately allocated by the transmitting station.

7. The transmitting station of claim 5, wherein the polling frame indicates frequency resources allocated for the second feedback frames and identifiers of the second reporting stations.

8. The transmitting station of claim 5, wherein the NDP frame comprises a first physical layer protocol data unit (PPDU) part including a legacy training field and a legacy signal field and a second PPDU part including a high efficiency short training field (HE-STF) and a high efficiency long training field (HE-LTF) and does not comprise a protocol service data unit (PSDU) field, wherein the first PPDU part is configured by a first point fast Fourier transform (FFT) operation and the second PPDU part is configured by a second point FFT operation such that a subcarrier spacing of the second PPDU part is four times fewer than a subcarrier spacing of the first PPDU part.

* * * * *